United States Patent [19]

Lorenz et al.

[11] Patent Number: 5,151,972
[45] Date of Patent: Sep. 29, 1992

[54] APPARATUS FOR AUTOMATICALLY CONNECTING TERMINAL DEVICE TO TELEPHONE LINES

[75] Inventors: Alan S. Lorenz, Seattle; Christopher K. Sutton, Everett, both of Wash.

[73] Assignee: Lynx Automation, Inc., Seattle, Wash.

[21] Appl. No.: 668,730

[22] Filed: Mar. 13, 1991

Related U.S. Application Data

[63] Continuation of Ser. No. 329,576, Mar. 28, 1989, abandoned.

[51] Int. Cl.$^5$ .......................................... H04M 11/00
[52] U.S. Cl. ........................................ 379/93; 379/97; 379/100
[58] Field of Search .............................. 379/93, 96-98, 379/100, 102, 184, 194, 105

[56] References Cited

U.S. PATENT DOCUMENTS

| | | | |
|---|---|---|---|
| 4,584,434 | 4/1986 | Hashimoto | 379/105 |
| 4,660,218 | 4/1987 | Hashimoto | 379/93 |
| 4,663,778 | 5/1987 | Takahashi | 379/100 |
| 4,677,660 | 6/1987 | Yoshida | 379/100 |
| 4,800,439 | 1/1989 | Yoshino | 379/100 |
| 4,821,312 | 4/1989 | Horton | 379/102 |
| 4,974,253 | 11/1990 | Hashimoto | 379/100 |
| 5,014,296 | 5/1991 | Saigaano | 379/100 |
| 5,036,534 | 7/1991 | Gural | 379/100 |

FOREIGN PATENT DOCUMENTS

| | | | |
|---|---|---|---|
| 62-281657 | 12/1987 | Japan | 379/100 |
| 62-281658 | 12/1987 | Japan | 379/100 |
| 63-142759 | 6/1988 | Japan | 379/100 |
| 0007802 | 12/1987 | PCT Int'l Appl. | 379/100 |
| 2183427 | 6/1987 | United Kingdom | 379/105 |
| 2213681 | 8/1989 | United Kingdom | 379/100 |

Primary Examiner—James L. Dwyer
Assistant Examiner—Wing F. Chan
Attorney, Agent, or Firm—Seed and Berry

[57] ABSTRACT

An improved method and system for integrating voice telephone and data terminal devices in a single system is described. The present system may be incorporated with an existing telephone system without modification of the telephone system. The present invention includes means for monitoring a telephone line and upon detection of a ringing signal, the system monitors the telephone line for either a DTMF or CNG signal. Upon detection of either signal, an incoming call is routed to a series connected device such as a data terminal.

23 Claims, 15 Drawing Sheets

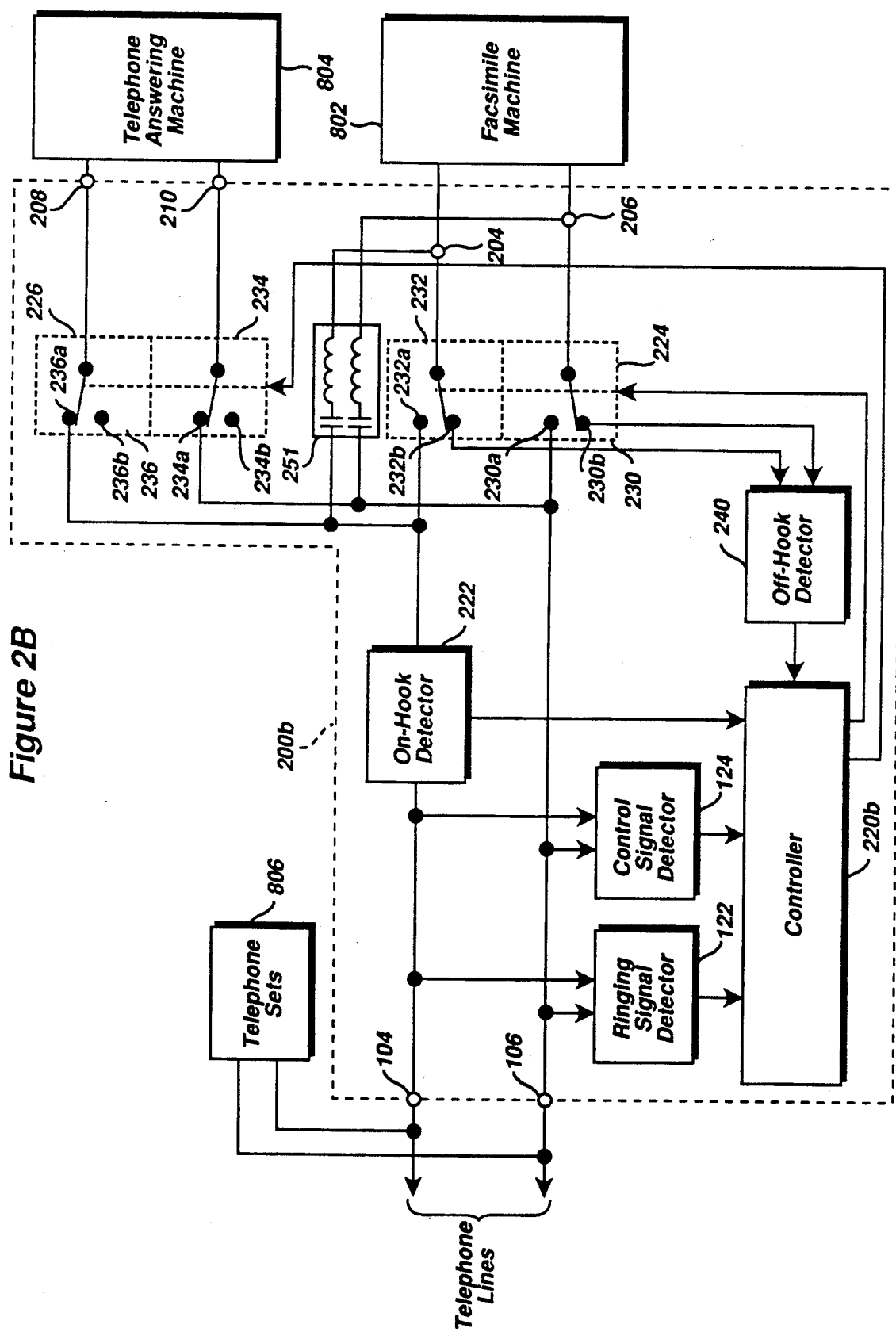

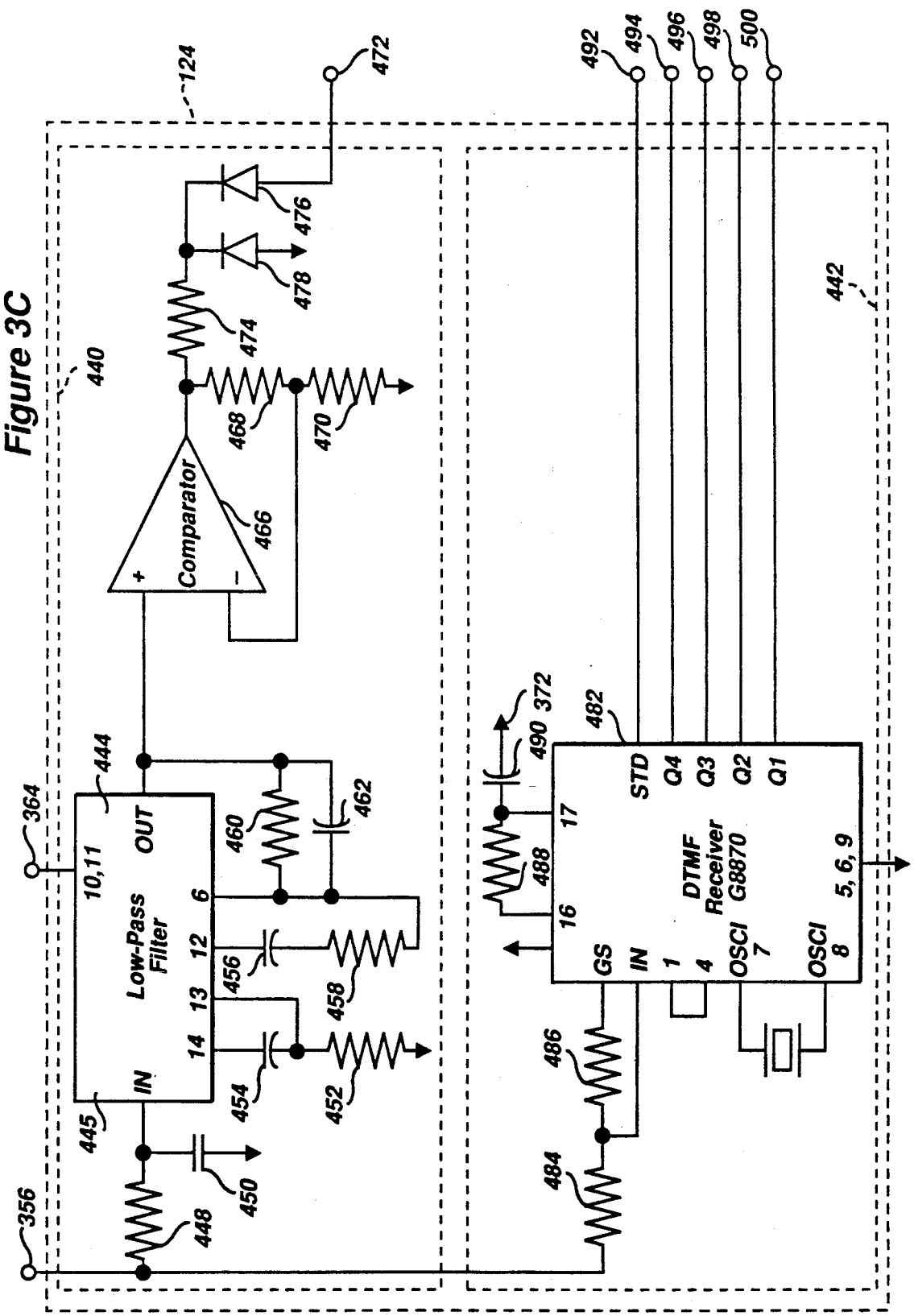

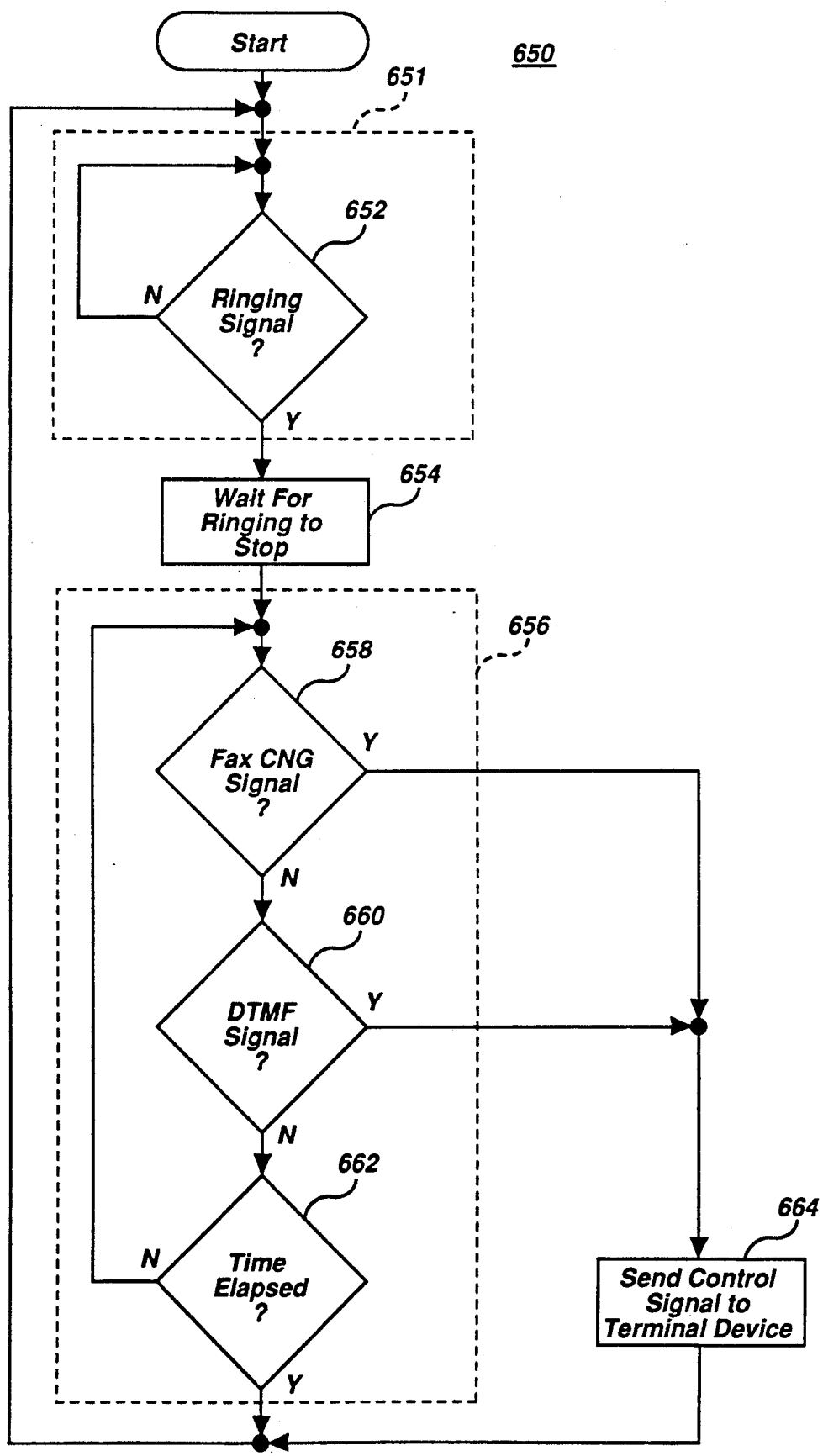

APPARATUS FOR AUTOMATICALLY CONNECTING TERMINAL DEVICE TO TELEPHONE LINES

CROSS-REFERENCE TO RELATED APPLICATION

This application is a continuation of U.S. application Ser. No. 07/329,576 filed Mar. 28, 1989, now abandoned.

FIELD OF THE INVENTION

This invention relates to the field of telephone message handling and more specifically to a switching apparatus for automatically connecting a terminal device, such as a facsimile system or modem, to a telephone loop circuit in response to a signal received over the telephone communication lines.

BACKGROUND OF THE INVENTION

Telephone systems have long been used for voice communication, and more recently for data communication, using such terminal devices as modems and facsimile systems. Typically, voice and data devices are used in a single location with dedicated telephone lines allocated to each type of device. In situations where multiple telephone lines are not available or are economically unfeasible, the telephone line may be coupled in parallel between the telephone set and the terminal device. When a telephone set and a terminal device are coupled in parallel to a single telephone line, a ringing signal cannot be differentiated as a request for voice communication with a telephone set or for data communication with a terminal device. This problem may be avoided with a device which can route an incoming ringing signal to the appropriate device.

Some prior systems, such as those disclosed in U.S. Pat. Nos. 4,660,218 and 4,584,434, show systems which automatically route telephone signals between a telephone set and a terminal device. A major disadvantage of these systems is that they must be connected in series between the telephone lines and the associated telephone set or terminal devices. This type of configuration is typically difficult to install and may require special expertise to implement.

In another type of system disclosed in U.S. Pat. No. 4,444,999, the device automatically disconnects a terminal device when an associated telephone set is taken off-hook. However, this system is not capable of automatically connecting a terminal device.

From the foregoing, no device is known which provides ease of installation while providing a means for automatically routing an incoming message to the appropriate voice or data device as instructed by the sending or receiving party.

SUMMARY AND OBJECTS OF THE INVENTION

In summary, in one aspect of the present invention, an apparatus automatically routes voice or data telephone signals to a desired telephone or terminal device. The apparatus is coupled to a telephone line, and it includes a ringing signal detector for detecting a ringing signal and a control signal detector for detecting a control signal on the telephone lines. Switching means coupled between the telephone lines and the desired telephone or terminal device connects the desired telephone or terminal device to the telephone line in response to a switch control signal. A controller coupled to the ringing signal detector and the control signal detector generates the switch control signal in response to a detected ringing signal and a predetermined control signal.

In another aspect of the present invention, the above apparatus may be modified by adding a ringing signal generator and means for detecting whether the telephone device or the terminal device is on-hook and means for detecting whether the terminal device is off-hook. In an idle state, the terminal device is disconnected from the telephone lines and the controller continuously monitors the telephone lines for a ringing signal. Upon detection of the ringing signal, the controller monitors the telephone line for a control signal, such as a CNG signal or a DTMF signal. Upon detection of the control signal, the controller causes the ringing signal generator to generate a ringing signal at the inputs of the terminal device. Once the ringing signal has been generated, the controller generates the switch control signal which causes the switching means to disconnect the serial telephone device and couple the terminal device to the telephone lines. The terminal device remains coupled to the telephone lines until the on-hook detector detects the end of the communication session at which time, the controller resets the switching means to an idle state wherein the serial telephone device is connected to the telephone line and the terminal device is disconnected from the telephone line. The off-hook detector is employed for outgoing calls wherein it is necessary to couple the terminal device to the telephone lines when the terminal device goes off-hook. When the terminal device goes off-hook, the off-hook detector signals the controller that this condition has been detected. The controller then generates the switch control signal which causes the switching means to disconnect the serial telephone device and couple the terminal device to the telephone lines, thus providing automatic operation for outgoing calls.

Accordingly, it is an object of the present invention to provide a method and means for automatically coupling a telephone set or terminal device to a telephone line.

It is another object of the present invention to provide a method and means for automatically coupling a telephone set or terminal device to a telephone line wherein the device which responds to an incoming call may not be directly coupled to other devices in the system.

It is another object of the present invention to provide a method and means for automatically coupling a telephone set or terminal device to a telephone line in response to a control signal initiated by a caller.

It is another object of the present invention to provide a method and means for allowing a telephone device and terminal device to share a telephone line wherein the terminal device does not answer an incoming call until a control signal generated by a user is received.

It is still another object of the present invention to provide a method and means for allowing a telephone device and a terminal device to share a telephone line wherein a terminal device may be automatically connected to the telephone line after the call has been answered by a telephone device.

BRIEF DESCRIPTION OF THE DRAWING

The present invention may be fully understood through the description below and the accompanying figures of drawing in which:

FIG. 2B is a block diagram of yet another embodiment of the present invention.

FIG. 3C is a schematic diagram of the control signal detector of FIGS. 1, 2A and 2B.

FIG. 5 is a flow diagram detailing the operation of the system of FIG. 1.

DETAILED DESCRIPTION OF THE INVENTION

Figure 1:
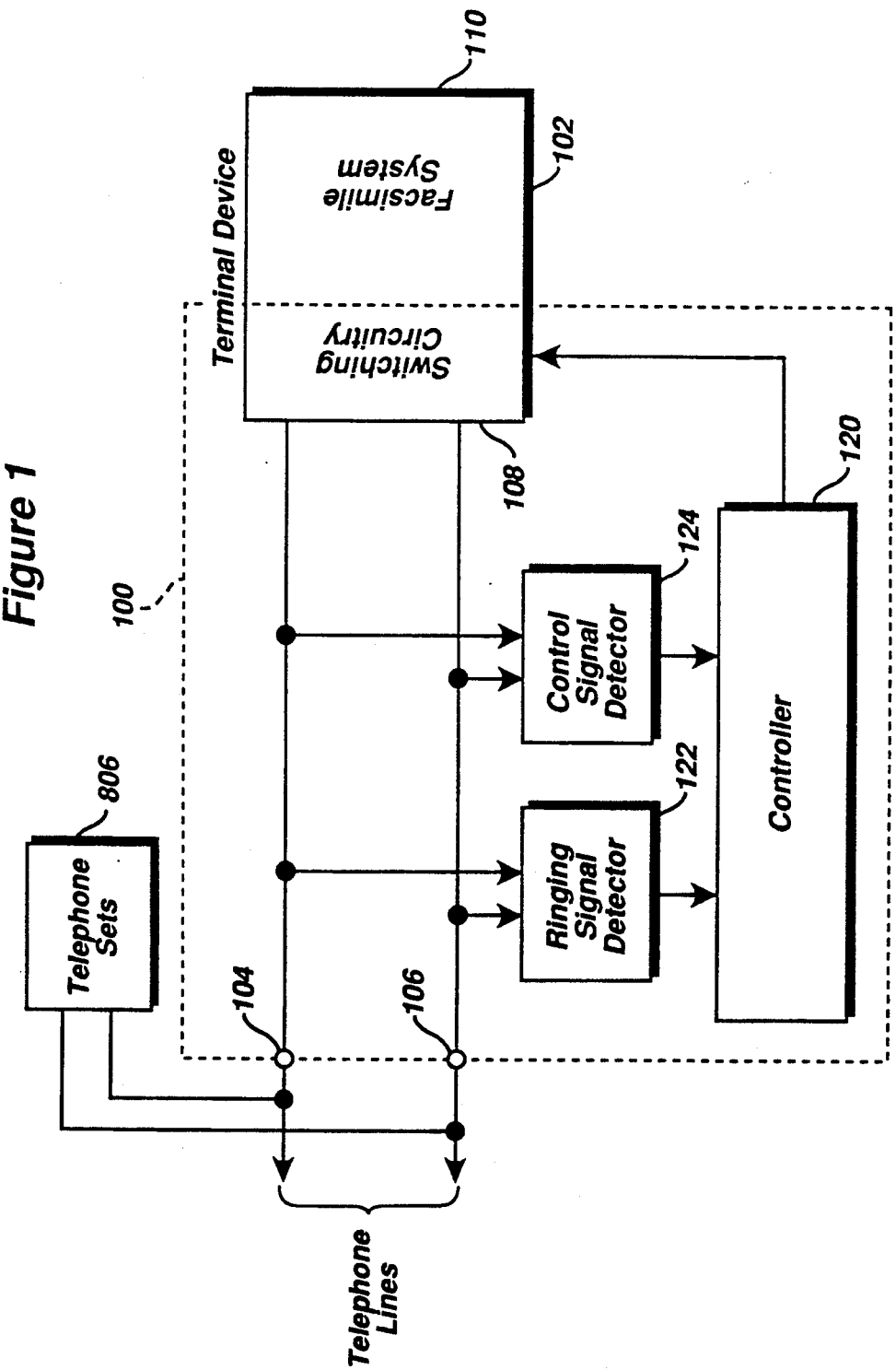
FIG. 1 is a block diagram of a first embodiment of the present invention.

Referring now to FIG. 1, in one aspect of the present invention, the system 100 is adapted for coupling a terminal device, such as a facsimile system (i.e., facsimile machine) 102, to terminals 104, 106 through switching circuitry 108. Terminals 104, 106 are further coupled to conventional telephone system ring and tip lines, respectively. The switching circuitry 108 is responsive to a switching means control signal generated by controller 120. The controller 120 is coupled to a ringing signal detector 122 and a control signal detector 124. The ringing signal detector 122 and the control signal detector 124 each have inputs coupled to the terminals 104, 106.

The control signal detector 124 comprises a conventional circuit for detecting Dual Tone Multi-Frequency (DTMF) signals as well as Calling Tone signals (CNG) from facsimile systems. The switching circuity 108 comprises a circuit for causing the terminal device to go "off-hook" in response to the switching means control signal generated by the controller 120. The controller 120 receives signals from the ringing signal detector 122 and the control signal detector 124 and generates the switching means control signal, after an appropriate time delay, upon the detection of the proper sequence of ringing and control tones on the telephone line.

The system 100 may typically be connected in parallel with a telephone set or telephone answering machine 804 and is adapted to be incorporated within the terminal device 110. The configuration of system 100 allows it to be used with telephone devices which are not directly connected to the terminal device and which may be placed at a remote location. The operation of system 100 is fully described in conjunction with FIG. 5. Briefly, the system 100 monitors the telephone line for a ringing signal. Once the ringing signal is detected, the system 100 monitors the telephone lines for either a predetermined DTMF signal or a facsimile CNG signal. Upon detection of either of these signals, the controller 120 generates the switching means control signal to couple the facsimile system 102 to terminals 104, 106 through the switching means 108. Once the facsimile system has been coupled to the telephone lines the system 100 reverts to an idle state where it waits to detect another ringing signal. Those skilled in the art will appreciate that the facsimile system 102 may be used alone or in association with a series coupled telephone device.

The switching circuitry 108 is adapted to be incorporated with the facsimile system 102 internally within the terminal device 110. This arrangement allows the system 100 to be connected in parallel with any number of telephone sets through terminals 104, 106. In typical systems, facsimile machines are preprogrammed to answer a telephone call after a predetermined number of rings. Once the predetermined number of rings has been received by the facsimile system, the facsimile system initiates the answer tone which begins the facsimile transmission sequence. If a user takes the telephone off-hook before the predetermined number of rings have been counted, the facsimile sequence must be manually initiated. The present invention allows for an indefinite number of telephone ring signals while still providing for remote initiation of the facsimile sequence. For example, assuming several telephone sets are connected in parallel with the facsimile system, and an incoming call is intercepted by a telephone set which is physically remote from the facsimile system, the facsimile sequence may be remotely initiated by pressing a preselected key or sequence of keys on a touch-tone telephone keypad. Alternatively, the facsimile sequence could be remotely initiated by pressing any key on the telephone keypad. In addition, if a user answers a call and the CNG tone or other control signal is present, the terminal will be coupled to the telephone lines and the terminal will initiate the facsimile sequence. The system could also be operated in a mode wherein the facsimile system may be set to answer the ringing signal after a predetermined number of rings thereby providing for unattended operation.

Figure 2A:
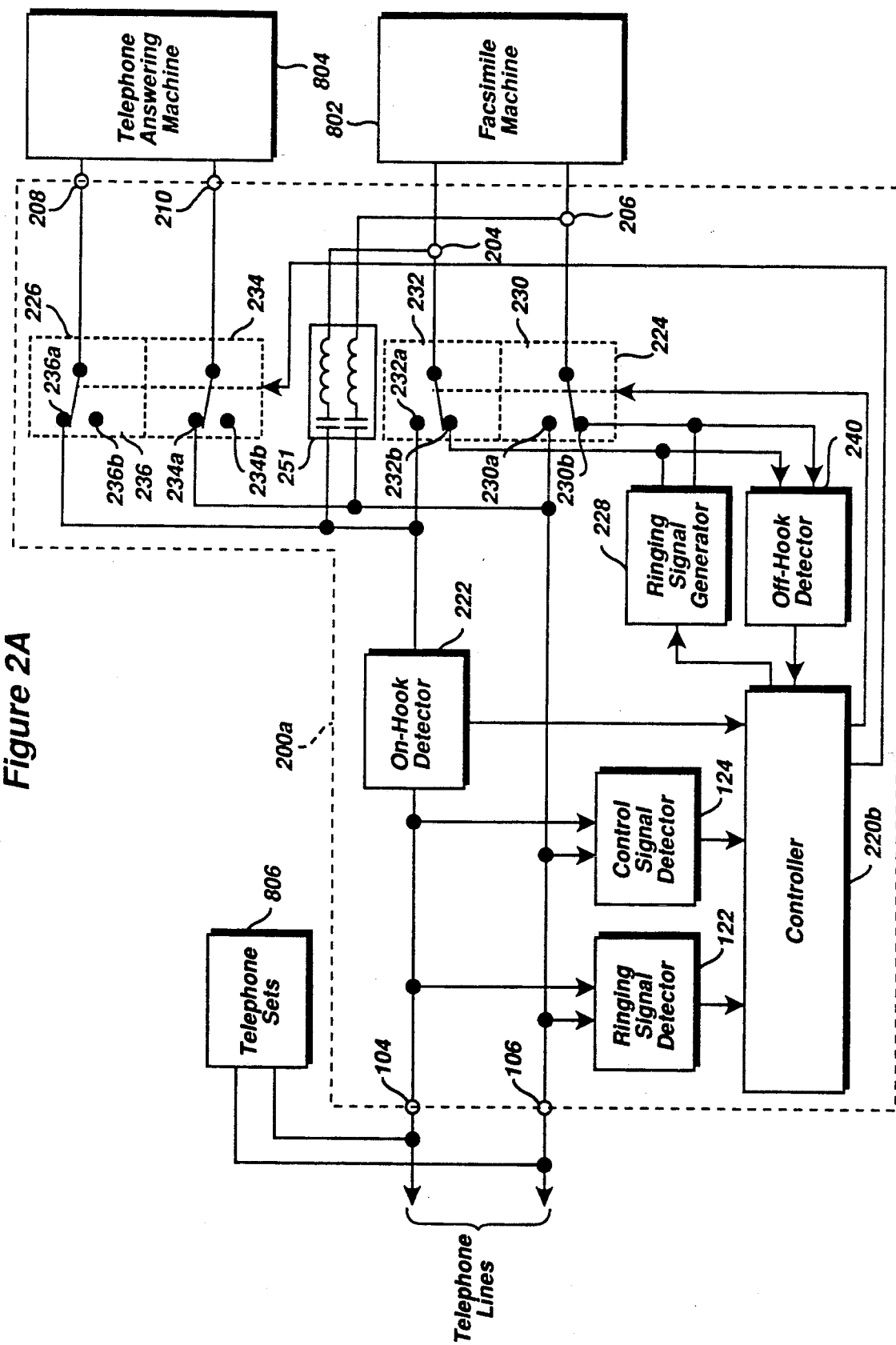
FIG. 2A is a block diagram of the preferred embodiment of the present invention

Referring now to FIG. 2A, the preferred embodiment of the present invention is shown. The system 200a is adapted to be coupled in series between the terminals 104, 106 and a facsimile machine 802 which is coupled to terminals 204, 206. The system 200a provides all of the advantages of system 100 but is constructed as a stand alone unit, thus avoiding the need to modify a standard facsimile system. In addition, the system 200a is adapted for use with serial connected devices such as a telephone answering machine 804 which may be coupled to terminals 208, 210. The system 200a is also adapted for connecting any number of telephone devices such as telephone sets 806 in parallel with terminals 104, 106.

The system 200a incorporates a ringing signal detector 122 and a control signal detector 124 which may be identical to the ringing signal detector and the control signal detector employed in system 100. The ringing signal detector 122 and the control signal detector 124 are coupled between the terminals 104, 106 and controller 220a. An on-hook detector 222 is coupled in series between the telephone line 104 and switching means 224, 226. The switching means 224, 226 suitably comprise double pole single throw (DPST) relay switches 230, 232 and 234, 236, respectively which are activated in response to control signals. The switches are shown in their idle state in FIG. 2A. The on-hook detector 222 provides an on-hook output signal line which is coupled to an input of controller 220a. An output of controller 220a is coupled to ringing signal generator 228 which has outputs coupled to poles 230b, 232b of DPST switches 230, 232, respectively. Poles 230a, 232a of DPST switches 230, 232 are coupled to terminals 106, 104, respectively. An off-hook detector 240 has inputs coupled to the output of ringing signal generator 228 as well as poles 230b, 232b of DPST switches 230, 232, respectively. The output of off-hook detector 240 is coupled to an input of controller 220a.

Figure 4A:
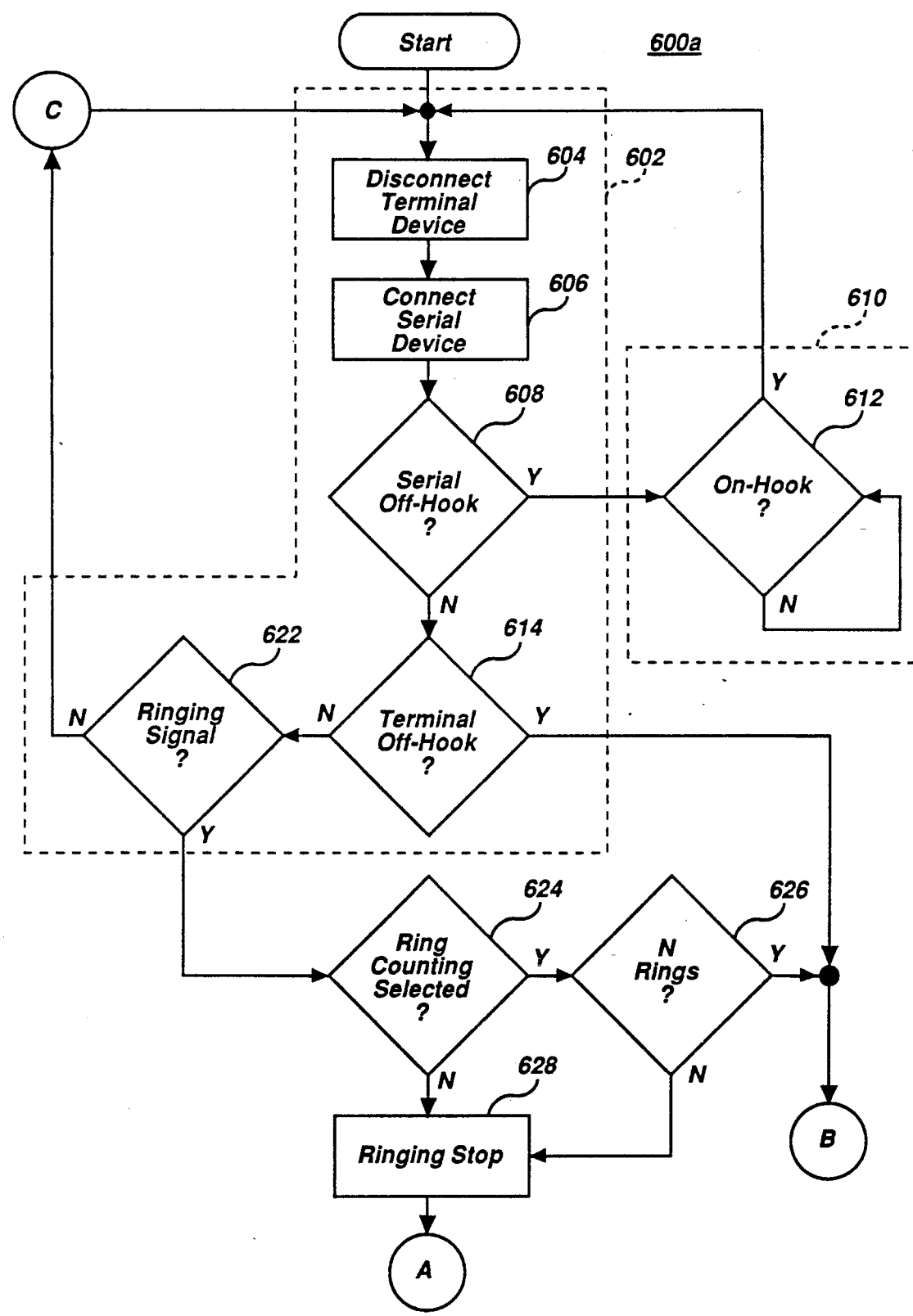
FIGS. 4A–4C are a series of flow diagrams detailing the operation of the system of FIG. 2A.
Figure 4B:
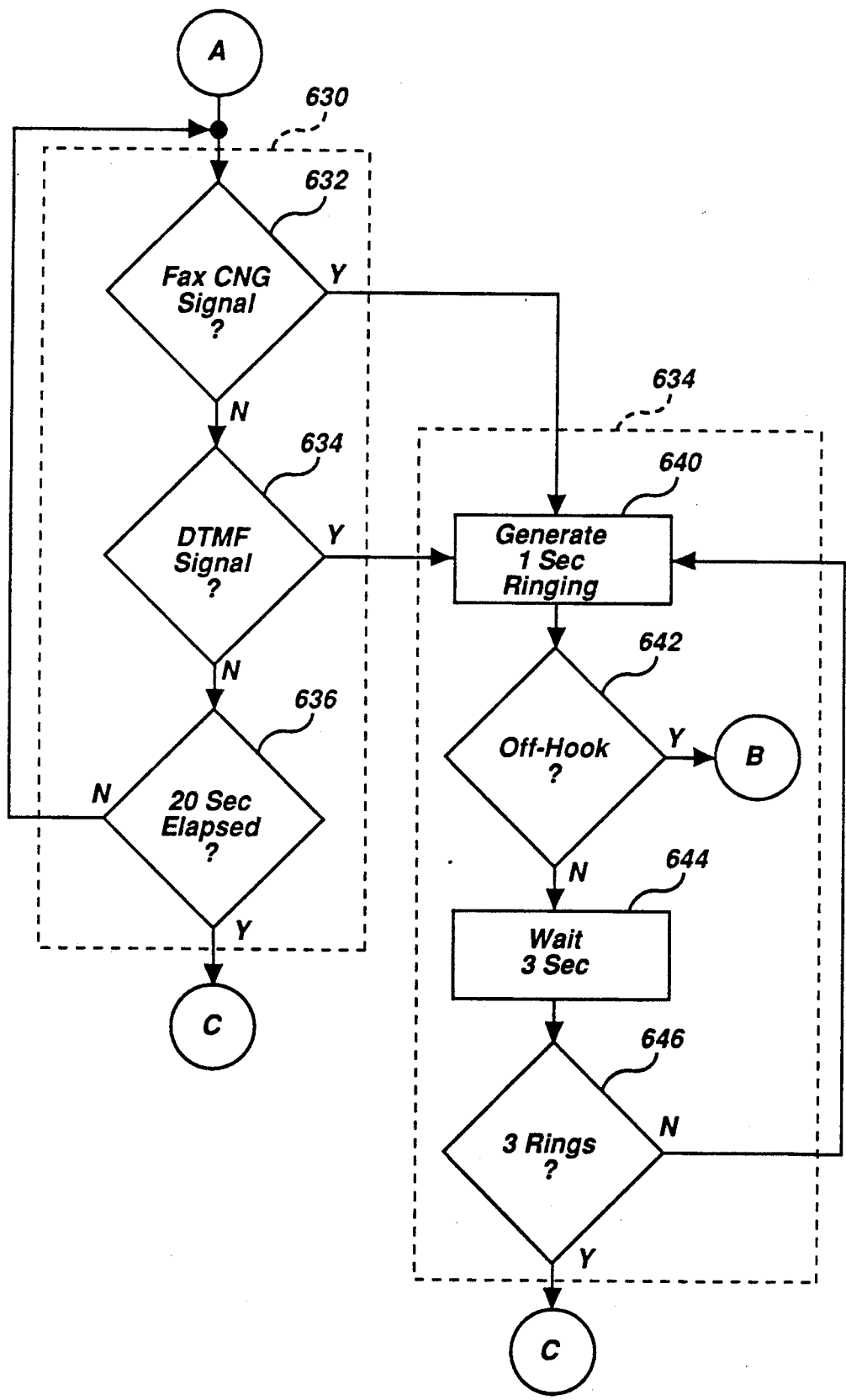
Figure 4C:
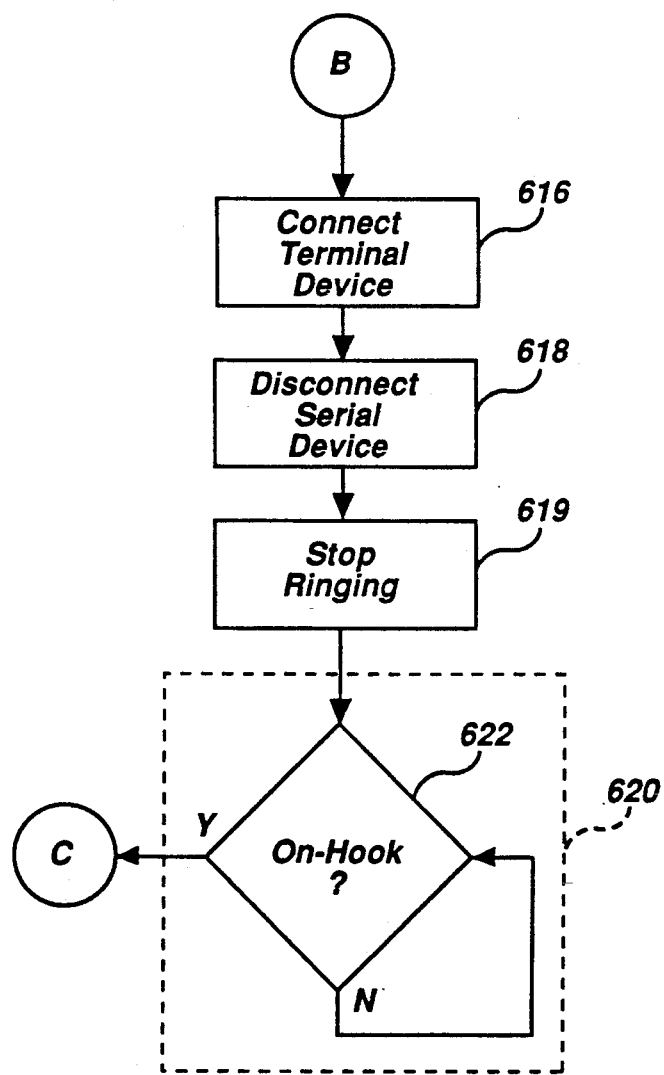

The detailed operation of the system 200a is described in conjunction with FIGS. 4A through 4C. Briefly, the system 200a is coupled to a terminal device, such as the facsimile machine 802, to terminals 204, 206; coupled to a serial device such as the telephone answering machine 804 at terminals 208, 210; and coupled to any number of parallel telephone devices, such as telephone sets 806 at terminals 104, 106. In operation, initially, when in an idle state, the facsimile system 802 is disconnected from the telephone lines by switches 230, 232. An incoming call may be intercepted by a parallel connected telephone set 806 at a remote location or by the serial connected telephone answering machine 804 which may play a prerecorded message. A typical prerecorded message could instruct the caller to depress a certain sequence of keys on the telephone keypad if the caller wants to make a facsimile communication or to remain on the line to leave a voice message. During this period, the control signal detector 124 monitors the telephone lines connected to the terminal for either that the DTMF or CNG tone indicating a caller wishes to employ facsimile communication. Upon detection of either the DTMF or CNG tone, the controller 220a causes the ringing signal generator 228 to generate a ringing signal at terminals 204, 206 to initiate the facsimile sequence. The controller 220a then generates the appropriate control signals to activate switches 230, 232, 234 and 236 thus coupling terminal 204 to pole 232a and terminal 206 to pole 230a to connect the facsimile system to telephone lines via the terminals, and thus disconnecting terminal 208 from pole 236a and terminal 210 from pole 234a to disconnect the serial connected telephone answering machine 804 from the telephone lines connected to terminals 104, 106. When the facsimile transmission is complete, the facsimile system will revert to an on-hook state. This state is detected by on-hook detector 222 which generates an on-hook signal which is provided to controller 220a. When the "on-hook" signal is generated, controller 220a resets switches 230, 232, 234 and 236 to their idle state shown in FIG. 2A, and enters an idle mode where system 200a waits for the next call.

Referring now to FIG. 2B, an alternate embodiment system 200b of the system 200a is shown. The system 200b eliminates the ringing signal generator 228 and replaces it with ring coupling means 251 which couples the ringing signal on terminals 104, 106 to terminals 204, 206, respectively. This allows the facsimile machine 802 to detect a ringing signal regardless of the position of switches 230, 232. The ring coupling means 251 is a circuit which passes only ringing signals and not higher frequencies or D.C. The ring coupling means may suitably comprise a series coupled inductor and capacitor tuned to 20 Hz. In this configuration, a facsimile machine may answer every call. However, the operation of the facsimile machine will be transparent to the user unless the control signal detector 124 detects the appropriate DTMF or CNG tones. With the exception of the ring coupling means 251, the operation of systems 200a and 200b is substantially identical. The detailed operation of system 200b is described in detail in conjunction with FIGS. 6A-6B.

Figure 6A:
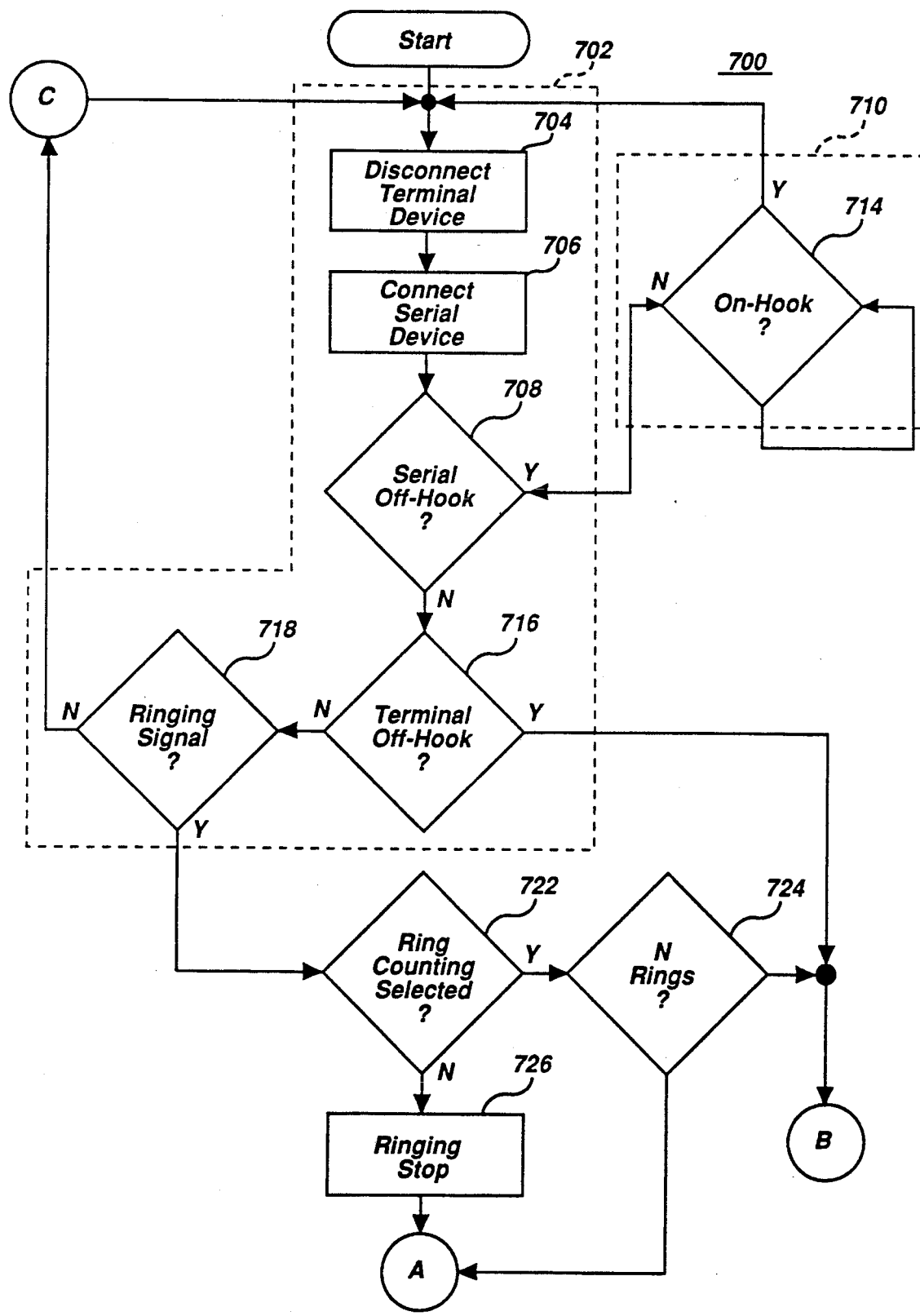
FIGS. 6A–6B are flow diagrams detailing the operation of the system of FIG. 2B.
Figure 6B:
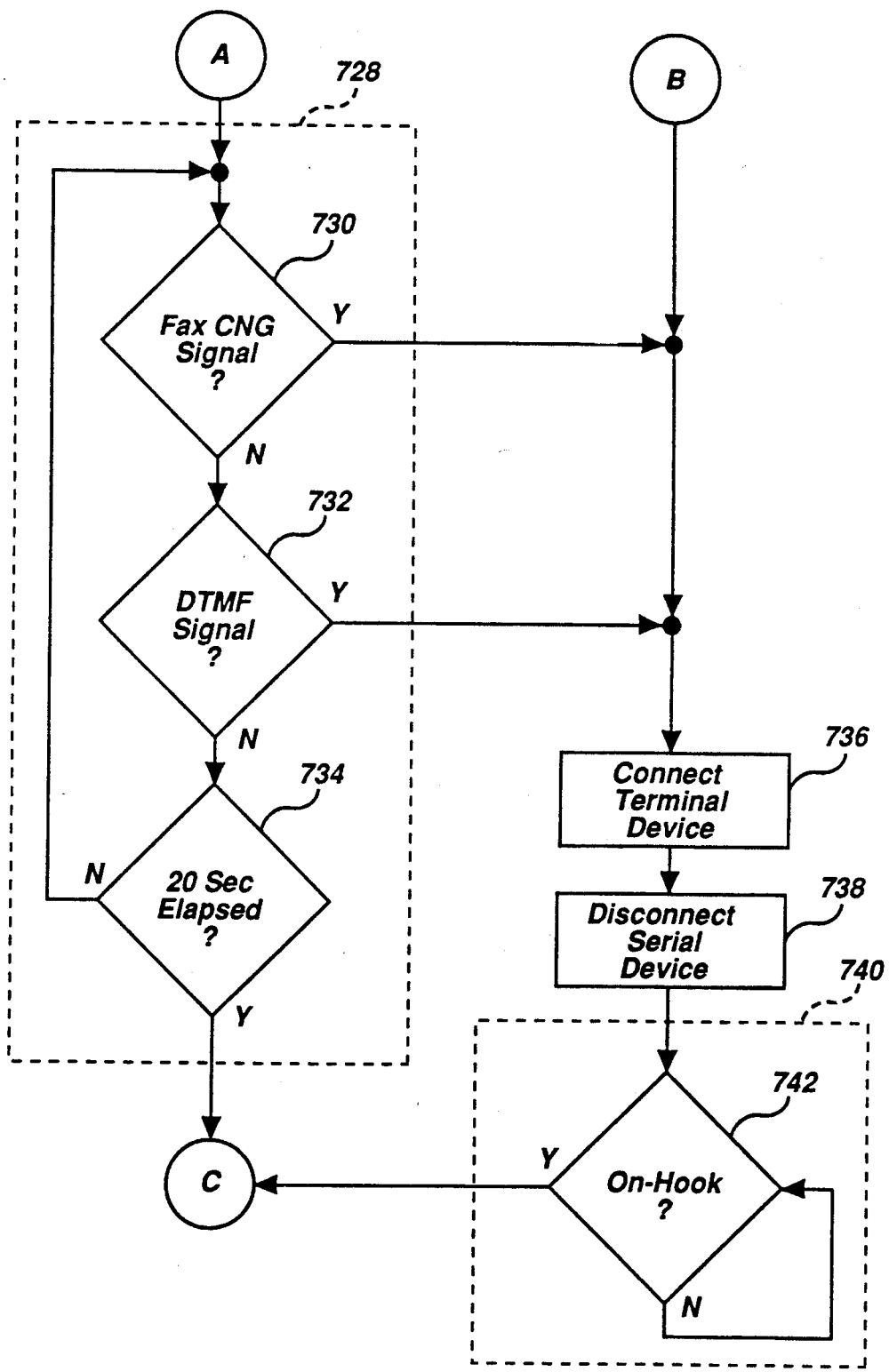

Referring now to FIGS. 3A-3D, the system 200a is shown in schematic form. The system 100 may be constructed with the same components, with the omission of the on-hook and off-hook detectors, the ringing signal generator, and a slight modification of control software of controller 120 as shown in FIG. 5. The system 200b may be constructed with the same components with the exception that the ringing signal generator is replaced by ring coupling means 251 and the control software is modified as shown in FIGS. 6A-6B.

Figure 3A:
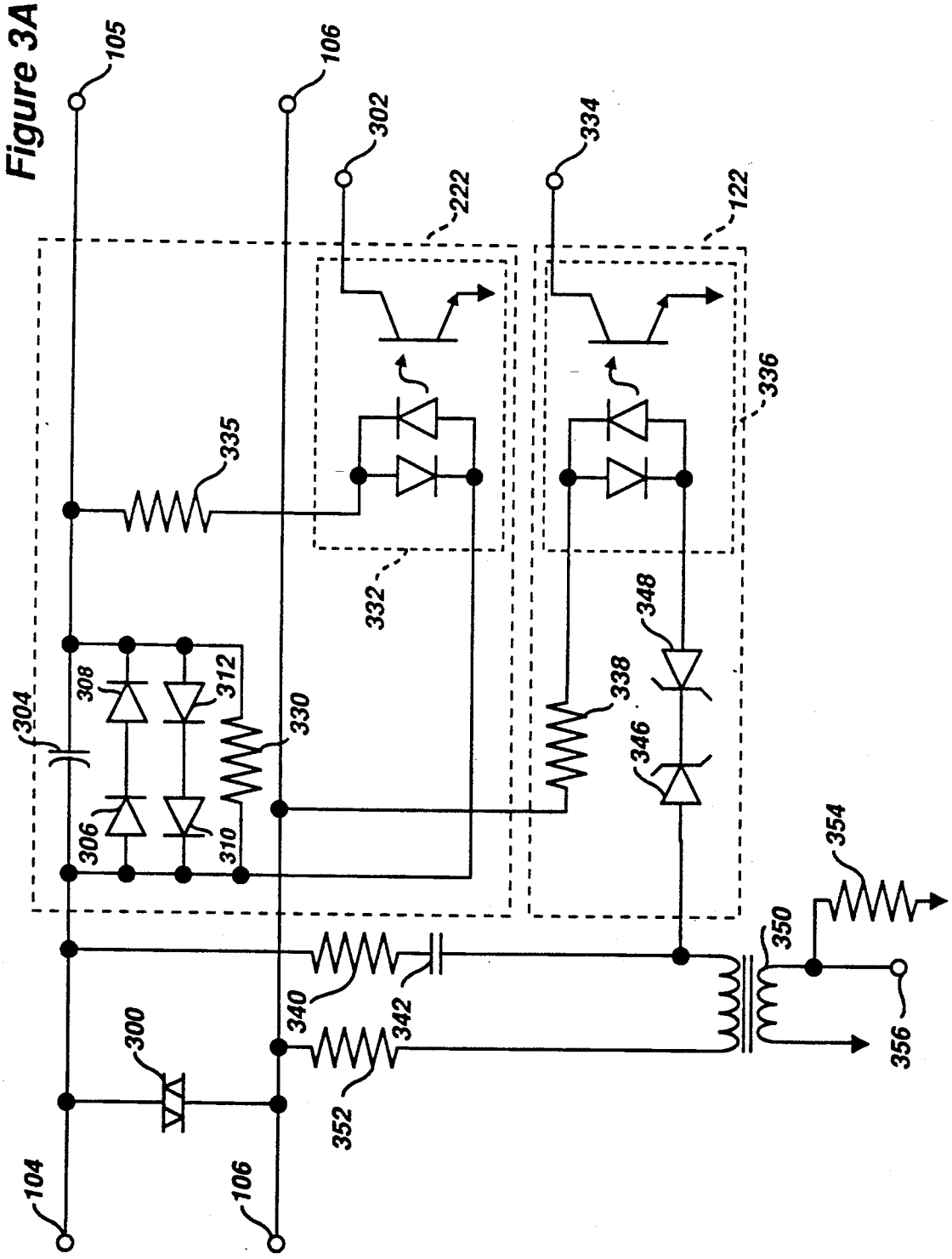
FIG. 3A is a schematic diagram of the on-hook detector of FIGS. 2A and 2B and the ringing signal detector of FIGS. 1, 2A and 2B.

As shown in FIG. 3A, the on-hook detector 222, causes a portion of the telephone loop current to energize the light-emitting diodes in an optical coupler 332. The on-hook detector 222 provides an on-hook output signal line which is coupled to an input of the controller 220a through terminal 302. The signal present on terminal 302 is at a high voltage when the telephone device or terminal device is on-hook and no loop current is flowing through the telephone lines, and is at a low voltage when the telephone device or terminal device is off-hook and loop current is flowing through the telephone lines.

Terminals 104, 106 interface the system 200a with a conventional telephone system. Transient absorber 300 is coupled between terminals 104, 106. Transient absorber 300 prevents high voltage transient signals from developing across terminals 104, 106 and damaging system 200a. On-hook detector 222 includes capacitor 304 which is coupled in series between terminals 104 and 105. Series connected diodes 306 and 308 are coupled in parallel with capacitor 304 between terminals 104 and 105. Series connected diodes 310 and 312 are also coupled in parallel with capacitor 304 between terminals 104 and 105, with an opposite polarity with respect to diodes 306, 308. Resistor 330 is coupled in parallel with capacitor 304 and diodes 306, 308 and diodes 310, 312. The connection of terminal 104, capacitor 304, diode 306, diode 310 and resistor 330 is coupled to one input of optical isolator 332. The other input of optical isolator 332 is coupled to terminal 105 through resistor 335. Resistor 335 is approximately 10 ohms. Resistor 330 is preferably 330 ohms.

In operation, whenever a device coupled to terminal 105 is on-hook, terminals 104 and 105 are at the same voltage so that no current flows through resistor 335 and either of the photo diodes in optical isolator 332. The photo transistor in optical isolator 332 is thus maintained at cutoff so that terminal 302 may be biased high through its connection to the controller 220a. When a device coupled to terminals 105, 106 is off-hook, a D.C. current loop is formed with the telephone system coupled to terminals 104, 106, wherein current flowing through diodes 306, 308 forward biases diodes 306, 308 thus causing a 1.2 volt voltage differential to develop across them. This voltage differential is also generated across resistor 335 and the photo diodes in the optical isolator 332, thus causing current to flow through the devices and turning on optical isolator 332. The phototransistor in optical isolator 332 is thus maintained in a forward biased condition so that terminal 302 is pulled low, thus indicating an off-hook condition.

The ringing signal detector 122 generates a logical low output signal at terminal 334 whenever a ringing signal is detected on terminals 104, 106. The ringing signal detector 122 includes an optical isolator 336 having one input coupled to terminal 106 through resistor 338. The other input of optical isolator 336 is coupled to terminal 104 through series coupled resistor 340, capacitor 342 and zener diodes 346, 348. Resistors 340 and 338 are preferably 4.7K ohms and capacitor 342 is preferably 0.47 microfarads. Zener diodes 346, 348 are coupled with their anodes in common and only conduct current when the voltage across them exceeds their respective breakdown voltages which is typically 6.8 volts. This occurs whenever a ringing signal is present on terminals 104, 106. In this state, current flows through series coupled resistor 340, capacitor 342, zener diodes 346, 348 the photo diodes in the optical isolator 336 and resistor 338, thereby turning on the phototransistor in the optical isolator 336 and driving terminal 334 low.

Transformer 350 is adapted for coupling the audio signal present on telephone terminals 104, 106 to the control signal detector 124. Transformer 350 is configured for converting the balanced audio signal present on terminals 104, 106 to an unbalanced signal employed by control signal detector 124. Transformer 350 is coupled to terminals 104, 106 through series coupled resistor 340 and capacitor 342, and resistor 352, respectively. Capacitor 342 removes any D.C. component from the signal applied to transformer 350. Resistors 340, 352 increase the impedance between transformer 350 and terminals 104, 106 and reduce the current drawn by transformer 350. One output terminal of transformer 350 is coupled to ground. The other output terminal of transformer 350 is coupled to terminal 356 which is further coupled to the input of control signal detector 124. Terminal 356 is further coupled to ground through resistor 354 which forms a voltage divider with input resistors of control signal detector 124 which will be further discussed below. Resistors 352 and 346 are preferably 4.7K ohms. Resistor 354 is preferably 2.4K ohms.

Figure 3B:
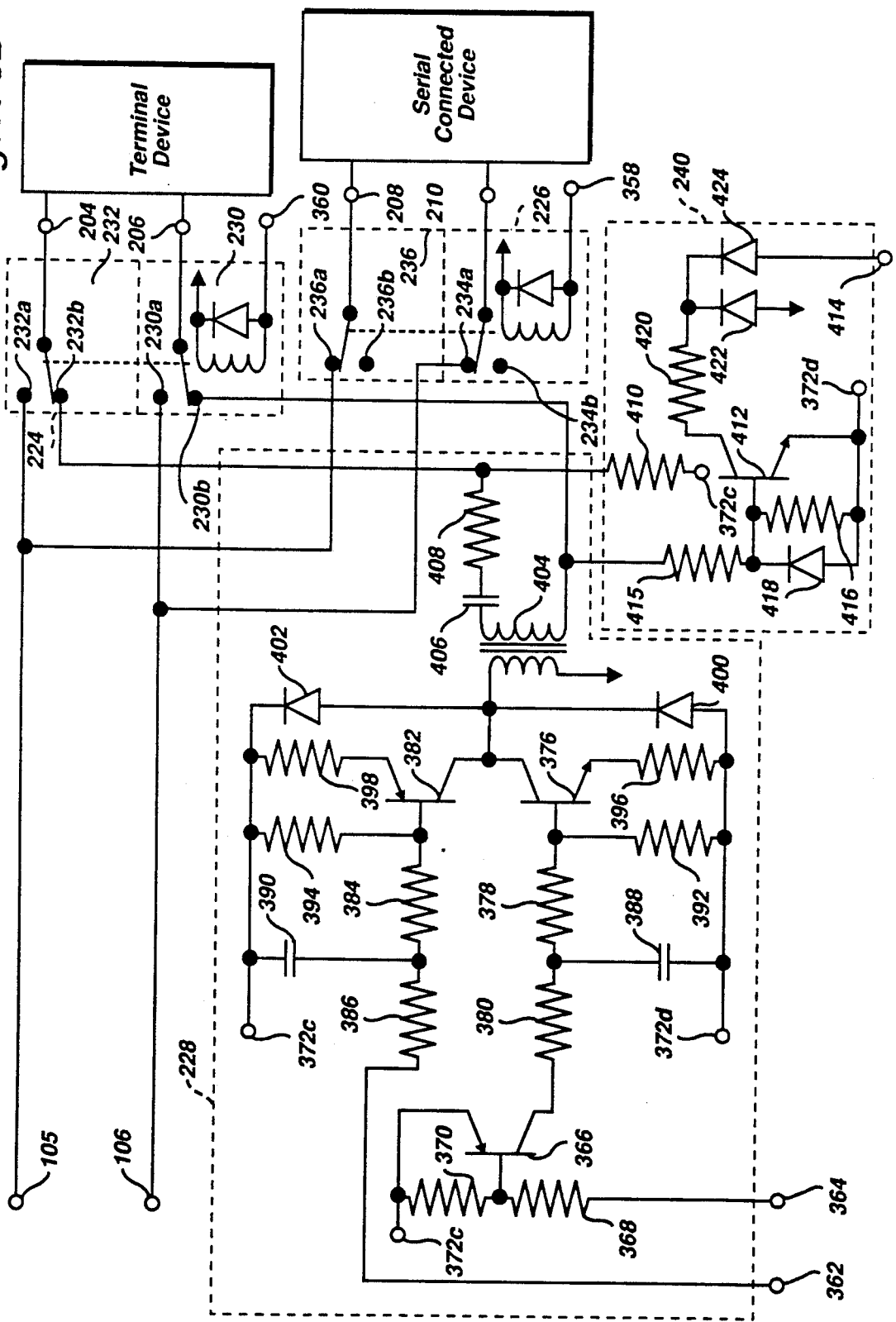
FIG. 3B is a schematic diagram of the ringing signal generator of FIG. 2A and the off-hook detector of FIGS. 2A and 2B.

Referring now to FIG. 3B, switching means 226, 224 may suitably comprise dual double-throw single pole (DPST) relays 234, 236 and 230, 236, respectively, or comparable solid-state electronic switches. Terminal 105 is coupled in parallel to poles 232a and 236a of relays 232 and 236, respectively. Terminal 106 is coupled in parallel to poles 230a and 234a, of relays 230 and 234, respectively. switching means 224, 226 are controlled by control signals coupled to terminals 358 and 360, respectively, which are generated by controller 220a.

The ringing signal generator 228 is controlled by signals generated by controller 220a which are coupled to terminals 362, 364. The signal generated at these terminals suitably comprises a square wave at a frequency which approximates the frequency and ringing pattern of a telephone ringing signal. Terminal 364 is coupled to the base of PNP transistor 366 through resistor 368. A resistor 370 is coupled between the base of transistor 366 and the power supply terminal 372d. The emitter of transistor 366 is coupled to the base of transistor 376 through series coupled resistors 378, 380. Terminal 362 is coupled to the base of transistor 382 through resistors 384, 386. Capacitor 388 is coupled between the connection of resistors 380 and 378 and terminal 372d. Capacitor 390 is coupled between the connection of resistors 386 and 384 and terminal 372c. Resistor 392 is coupled between the base of transistor 376 and terminal 372d. Resistor 394 is coupled between the base of transistor 376 and terminal 372c. Resistor 396 is coupled between the emitter of transistor 376 and terminal 372d. Resistor 398 is coupled between the emitter of transistor 382 and terminal 372c. The collectors of transistors 376, 382 are coupled together. Diode 400 is coupled between the collectors of transistors 376, 382 and terminal 372d. Diode 402 is coupled between the collectors of transistors 376, 382 and terminal 372c. Terminals 372c and 372d are suitably coupled to +12 volt and −12 volt voltage sources, respectively.

The output of ringing signal generator 228 is formed by step-up transformer 404 which is disposed with one input coupled to the collectors of transistors 376, 382 and the other input coupled to ground. One output transformer 404 is coupled to pole 232b of relay 232 through series coupled capacitor 406 and resistor 408. The other output of step-up transformer 404 is coupled to node 230b of relay 230. Resistors 368 and 370 are preferably 4.7K ohms. Resistor 380 is preferably 330 ohms. Resistor 378 is preferably 68 ohms. Resistor 386 is preferably 82 ohms. Resistor 384 is preferably 68 ohms. Resistors 394 and 392 are preferably 43 ohms. Resistors 398 and 396 are preferably 2 ohms. Capacitors 388 and 390 are preferably 220 microfarads. Capacitor 406 is preferably 2.2 microfarads. Resistor 408 is preferably 330 ohms.

In operation, in an idle state, terminals 362 and 364 are at a high voltage and no current flows through the circuit. Whenever a ringing signal is required, the controller 220a generates a square wave at terminals 362, 364 which alternately pulls terminals 362, 364 low at a rate of 20 Hz. This signal is converted to a signal which approximates a sine wave by capacitors 388, 390. When terminal 362 is high and terminal 364 is low, transistor 382 turns on thus producing an output current. At the same time transistor 366 is turned off which also shuts off transistor 376. Since transistor 376 is shut off, the current produced by transistor 382 is directed into transformer 382. In the alternate cycle, terminal 362 is driven high and terminal 364 is pulled low. During this cycle, transistor 382 is turned off and transistor 366 turns on, thus forward biasing transistor 376. When transistor 376 turns on, the current stored in transformer 404 is drawn out through the collector of transistor 376. Thus, current flows into and out of transformer 404 at a rate of 20 Hz based on the signal generated at terminals 362, 364. Step-up transformer 404 converts the signal, generated by transistors 382, 386, to a signal of approximately 90 volts, in response to the alternating current flow generated by transistors 382, 376. Diodes 400, 402 prevent large voltage transients from being generated across transistors 376, 382.

The off-hook detector 240 generates an off-hook signal which is produced at terminal 414 and applied to the controller 220a. The off-hook detector comprises transistor 412, wherein the base of transistor 412 is coupled to pole 230b through resistor 415. Resistor 416 and diode 418 are coupled in parallel between the base and emitter of transistor 412. The emitter of transistor 412 is coupled to the 12 volt power supply terminal 372d. Output terminal 414 is coupled to the collector of transistor 412 through series connected resistor 420 and diode 424. Diode 422 is coupled between ground and the connection of resistor 420 and diode 424. A resistor 410 is coupled between the +12 volt power supply terminal 372c and pole 232b. Resistor 415 is preferably 100K ohms Resistor 416 is preferably 22K ohms. Resistor 420 is preferably 4.7K ohms.

In operation, in an idle state, the terminal device is coupled to poles 230b and 232b of switching means 230. In this state, the terminal device is isolated from the conventional telephone loop circuit. A 24 volt DC signal is applied to one input of the terminal device through resistor 410. When the terminal device is on-hook, it presents a high impedance source between terminals 204, 206 and no current flows between poles 232b and 230b. When the terminal device goes off-hook, the terminal device switches to a low impedance state and current flows from resistor 410, through the terminal device and into the base of transistor 412, thus causing it to turn on. In this state, the collector of transistor 412 is switched low, thus pulling terminal 414 low. Diode 414 prevents the voltage at terminal 414 from falling far below ground, thus providing a level shifting function. Diode 418 protects transistor 412 from breakdown when the 90 volt ringing signal is generated by transformer 404. When the terminal device goes "on-hook", the current to the base of transistor 412 is cut off and terminal 414 is pulled high by the associated port of controller 220a.

Referring now to FIG. 3C, the control signal detector 124 comprises a CNG detector 440 and a DTMF detector 442. The CNG detector 440 comprises a low-pass filter 444 and a comparator 446. The low-pass filter 444 suitably comprises an MC145414 switched-capacitor filter integrated circuit 445 available from Motorola. The input of low-pass filter 444 is coupled to terminal 356 through resistor 448. A capacitor 450 is coupled from the input of low-pass filter 444 to ground. A series coupled resistor 452 and capacitor 454 are coupled from pin 14 of the MC145414 switched-capacitor filter integrated circuit 445 to ground. Pin 13 of the MC145414 switched-capacitor filter integrated circuit is coupled to the connection of resistor 452 and capacitor 454. Series connected capacitor 456 and resistor 458 are coupled between pins 12 and 6 of MC145414 switched-capacitor filter integrated circuit 445. Parallel connected resistor 460 and capacitor 462 are coupled between the output and pin 6 of MC145414 switched-capacitor filter integrated circuit 445. Pins 10 and 11 of MC145414 switched-capacitor filter integrated circuit 445 are coupled to terminal 464 Which is further coupled to a 50 KHZ clock signal generated by controller 220a. Resistor 448 is preferably 4.7K ohms. Resistors 452 and 458 are preferably 22K ohms. Resistor 460 is preferably 680K ohms. Capacitors 450, 454 and 456 is preferably 0.01 microfarads. Capacitor 462 is preferably 220 picofarads.

The output of low-pass filter 444 is coupled to the non-inverting input of comparator 466. The inverting input of comparator 466 is coupled to its output through resistor 468. The inverting input of comparator 466 is further coupled to ground through resistor 470. The output of comparator 466 is coupled to output terminal 472 through series coupled resistor 474 and diode 476. Diode 478 is coupled between ground and the connection of resistor 474 and diode 476. Resistor 468 is preferably 100K ohms. Resistor 470 is preferably 2K ohms. Resistor 474 is preferably 4.7K ohms. The power supply and ground inputs of the MC145414 switched-capacitor integrated circuit 445 are coupled in accordance With the manufacturer's recommendations.

The CNG detector 440 is coupled to the telephone line through terminal 356. The CNG detector 440 detects the presence of CNG signals which are typically a 1100 Hz tone present for ½ second bursts separated by 3 second pauses. In operation, low-pass filter 444 blocks signals above 1300 Hz, such as modem answering tones. The comparator 446 detects zero-crossings of the filtered signal, which are coupled to controller 220a. Controller 220a counts the number of zero crossings that occur within a fixed interval to determine whether the 1100 Hz CNG signal is present.

The control signal detector 124 further comprises a DTMF detector 442. The DTMF detector comprises a DTMF receiver 482 which is suitably a G8870P integrated circuit available from GTE. The input of DTMF receiver 482 is coupled to terminal 356 through resistor 484. Resistor 486 is coupled between the input and the GS terminal of DTMF receiver 482. Pins 1 and 4 of the G8870 integrated circuit are coupled together. A 3.58 MHZ crystal is coupled to the oscillator inputs of the DTMF receiver 482. Pin 16 is coupled to terminal 372 through series coupled resistor 488 and capacitor 490. Pin 17 of DTMF receiver 482 is coupled to the connection of resistor 488 and capacitor 490. Resistor 484 is suitably 22K ohms. Resistor 486 is preferably 100 k ohms. Resistor 488 is preferably 330K ohms.

In operation, audio signals present on terminals 104, 106 are monitored by DTMF receiver 482. DTMF receiver 482 outputs a hexidecimal code which is related to signals at its input. When a DTMF signal is detected, DTMF receiver 482 outputs the hexidecimal code to controller 220a through terminals 492, 494, 496, 498, and 500.

Figure 3D:
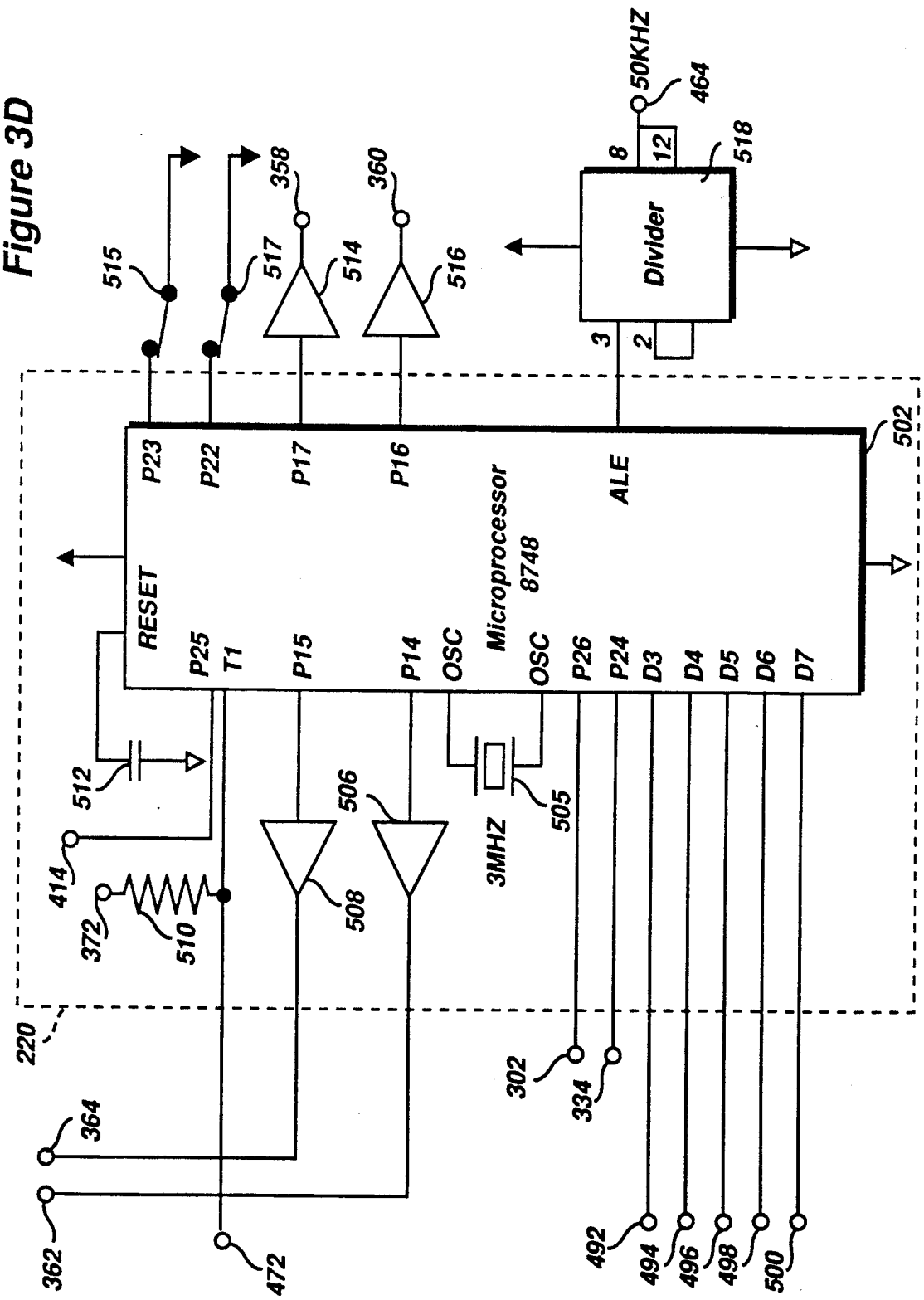
FIG. 3D is a schematic diagram of the controller which may be adapted for use with the system of FIG. 2A.
Figure 3E:
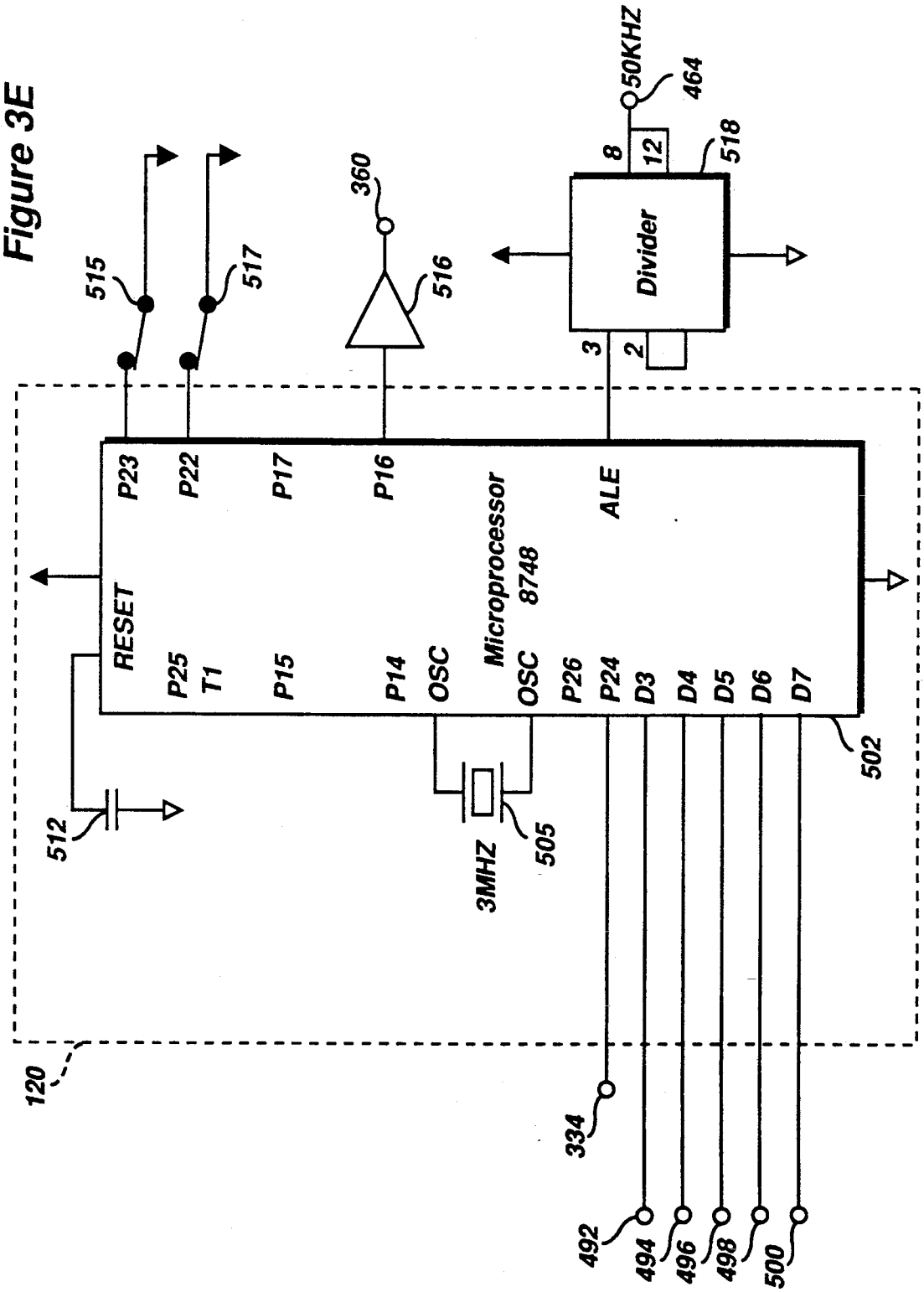
FIG. 3E is a schematic diagram of the controller which may be adapted for use with the system of FIG. 1.
Figure 3F:
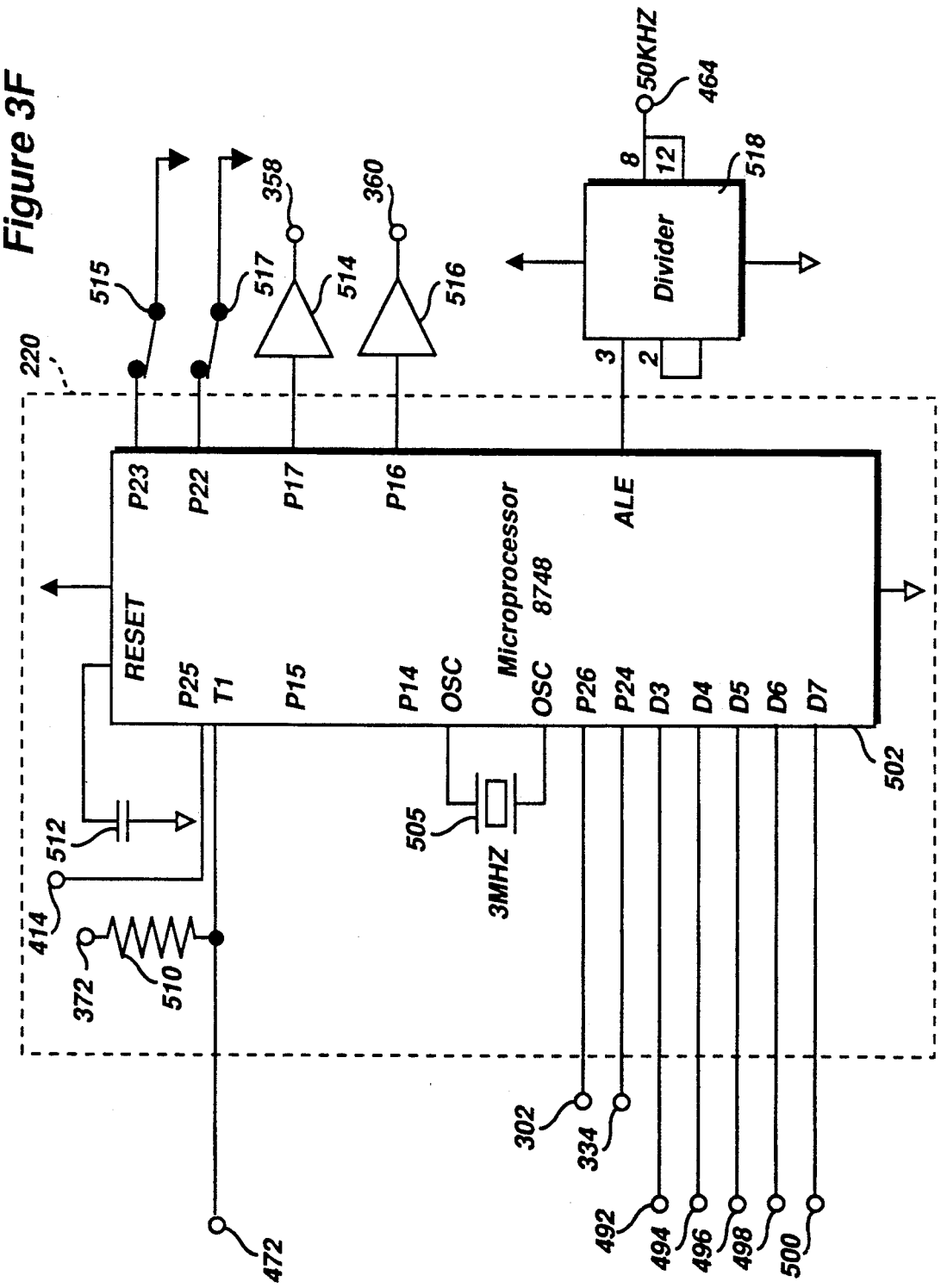
FIG. 3F is a schematic diagram of the controller which may be adapted for use with the system of FIG. 2B.

Referring now to FIGS. 3D-3F, the controllers 120, 220a and 220b are shown in schematic form. The controllers 120, 220a, and 220b comprise essentially identical hardware controlled by alternative software implementations and slightly modified hardware interfaces. The controllers 120, 220a, 220b comprise a microprocessor with internal random access memory (RAM) and read only memory (ROM) The controllers 120, 220a and 220b are suitably an 8748 microprocessor available from Intel. The controller 220a receives signals from the on-hook detector 222, ringing signal detector 228, off-hook detector 240, CNG detector 440, and DTMF detector 442. The controller 220a outputs signals to ringing signal generator 228 and switching means 224, 226.

The controller 220a comprises microprocessor 502 which is disposed with inputs D3-D7 coupled to terminals 492-500, respectively, which are further coupled to the outputs of DTMF decoder 482. A 3 MHz clock crystal 505 is coupled to the oscillator inputs of microprocessor 502. Input ports P24 and P26 are coupled to terminals 302 and 334, respectively which are further coupled to the respective outputs of the on-hook detector 222 and the ringing signal detector 122. Output ports P14 and P15 are coupled to terminals 362 and 364 through buffers 506, 508, respectively. Terminals 362 and 364 comprise the square wave inputs of ringing signal generator 228. Input T1 is coupled to terminal 472 which is further coupled to the output of CNG detector 440. Input T1 is further coupled to power supply terminal 372a through resistor 510 which is suitably 22K ohms. Input port P25 is coupled to terminal 414 which is further coupled to the output of off-hook detector 240. A capacitor 512 is coupled between the reset input and ground to reset the microprocessor during power-up. Ports P23 and P22 are coupled to ground through switch 515 and switch 517, respectively. Switches 515 and 517 are used to enable or disable ring counting wherein if both switches are open, ring counting is disabled; if switch 515 is open and switch 517 is closed, the terminal device will be connected after 2 rings; if switch 515 is closed and switch 517 is open, the terminal device will be connected after 4 rings; and, if switch 515 is closed and switch 517 is closed, the terminal device will be connected after 6 rings. Port P17 is coupled to terminal 358 through buffer 514. Terminal 358 is further coupled to switching means 226. Port P16 is coupled to terminal 360 through buffer 516. Terminal 360 is further coupled to switching means 224. The ALE output of microprocessor 502 is coupled to the input of divide-by-four divider 518. The output of divider 518 is coupled to terminal 464 which is further coupled to CNG detector 440. The output of divider 518 comprises a 50 KHz signal used to clock low-pass filter 444. The power supply and ground inputs of microprocessor 502 are coupled in accordance with the manufacturers instructions. The detailed operation of controller 220a is discussed in conjunction with FIGS. 4A-4C.

Referring now to FIG. 3E, the controller 120 is shown in schematic form. The controller 120 is essentially identical to the controller 220a with the exception that the interfaces to the ringing signal generator 228, the off-hook detector 240, and the on-hook detector 222 are omitted. In addition, since a serial device interface is not required in this embodiment, the corresponding switch interface for the serial device may be deleted. The operation of the controller 120 is discussed in detail in conjunction with FIG. 5A-5B.

Referring now to FIG. 3F, an alternate embodiment 220b of the controller 220a is shown in schematic form. The controller 221 is essentially identical to the controller 220a with the exception that the interface with the ringing signal generator is omitted. The controller 220b is adapted for operation with the system 200b. The detailed operation of the system 200b is described in conjunction with FIGS. 6A-6B.

Referring now to FIGS. 4A-4C, the operation of the system 200a is described in detail. When invoked, the routine 600a starts in idle loop 602 and disconnects the terminal device in item 604 by generating the switching means control signal coupled to terminal 360. Item 604 then connects the serial device by removing the control signal coupled to terminal 358. Decisions 608 and 614 then test the off-hook control signal to determine whether either device is off-hook. This occurs whenever either device is placing an outgoing call. If decision 608 determines the serial device is off-hook, program control enters connected loop 610 until the call is completed and on-hook detector detects an on-hook condition at which time, the program returns to item 604. If decision 608 does not detect the serial device is off-hook, control passes to decision 614 which determines whether the terminal device is off-hook. If so, control passes to item 616 which generates the switching means control signal coupled to terminal 360 to connect the terminal device. Item 618 then disconnects the serial device and because there is no ringing signal present in item 619, the program proceeds to connected loop 620. The program enters connected loop 620 wherein decision 622 monitors the telephone lines to detect an on-hook condition. When the on-hook condition is detected, program control returns to item 604. Thus, for outgoing calls, the terminal device and the serial device function normally.

While in idle loop 602, if decisions 608 and 614 have not detected an off-hook condition, decision 622 monitors the output of the ringing signal detector 122 to determine whether a ringing signal is present on the telephone lines. If not, program control passes to item 604 to repeat the idle loop. If a ringing signal is detected, decision 624 determines whether ring counting is selected. If so, decision 626 counts the number of rings until "N" rings occur or ringing stops. If N rings occur before the ringing stops, the ringing signal will be coupled to the terminal device by item 616, causing it to go off-hook, and the serial device is disconnected by item 618. The program then remains in connected loop 620 for the duration of the call. If ringing stops before "N" cycles occur, the program proceeds to monitor loop 630. If ring counting is not selected, decision 624 passes program control to item 628 which waits for ringing to stop. If the ringing stops either because the ringing stops in less than N rings as detected by decision 626 or because a parallel or serial device answers the call as detected by item 628, the program enters monitor loop 630.

The monitor loop 630 monitors the telephone lines for the presence of a control signal; either a CNG tone or DTMF tone wherein the terminal device will be coupled to the telephone line if either tone is detected. The monitor loop 630 comprises decision 632 which tests the signal produced by the CNG detector 440 to determine whether the CNG signal is present on the telephone lines. If so, control passes to ringing loop 634. If not, program control proceeds to 635 to determine whether a DTMF signal is present. If so, control proceeds to ringing loop 634. If not, control passes to decision 636 to determine whether 20 seconds have elapsed. If 20 seconds have not elapsed, control returns to decision 632. If 20 seconds have elapsed, control returns to idle loop 602 at item 604.

Ringing loop 634 is invoked to generate a ringing signal to activate the terminal device. In ringing loop 634, the ringing signal generator is repeatedly turned on for one second and off for three seconds. When the terminal device answers in response to the ringing signal, off-hook detector 240 causes the program to exit ringing loop 634, connect the terminal device, disconnect the serial device, and invoke connected loop 620. When invoked, ringing loop 634 executes item 640 to generate a one second ringing signal. Decision 642 then determines whether the terminal device answered the ringing signal. If so, control passes to item 616. Otherwise, control passes to item 644 to generate a three second waiting period. When the three second period has elapsed, decision 646 tests an internal counter to determine whether three one second rings have been generated. If not, control returns to item 640. If three rings have been generated and the terminal device has not answered, control returns to idle loop 602 at item 604.

Referring now to FIG. 5, a flow diagram describing the operation of system 100 is shown. The system 100 is adapted to be incorporated within a facsimile system wherein the system 100 monitors the telephone lines for a ringing signal. Once the ringing signal stops, the system monitors the telephone lines for a control signal. If a control signal is detected, the system 100 generates a control signal to couple the facsimile system to the telephone line. The system 100 then returns to an idle state until the next ringing signal is detected. For outgoing calls, the facsimile system operates in a conventional manner.

When invoked, the routine 650 enters idle loop 651 until decision 652 detects a ringing signal. When a ringing signal is detected, the program proceeds to item 654 where the program waits until the ringing stops. When the ringing stops, the program proceeds to monitor loop 656.

The monitor loop 656 monitors the telephone lines for the presence of a control signal; either a control signal; either a CNG tone or DTMF tone wherein the terminal device will be coupled to the telephone line if either tone is detected. When item 654 determines ringing has stopped, the program proceeds to decision 658 to detect a CNG signal. If no CNG signal is detected, the program proceeds to decision 660 to detect a DTMF signal. If no DTMF signal is detected, decision 662 determines whether 20 seconds have elapsed. If so, the program returns to idle loop 650. If 20 seconds have not elapsed, the program returns to the beginning of monitor loop 656.

If decision 658 or 660 detects a CNG or DTMF signal, respectively, the program proceeds to item 664 which generates the control signal to cause the facsimile system to be coupled to the telephone lines. The program then returns to the beginning of idle loop 651.

Referring now to FIGS. 6A through 6C, the operation of controller 220b of system 200b is described in detail. The system 220b is essentially identical to system 200a with the exception that the ringing signal generator is eliminated and replaced with ring coupling means 517 so that the ringing signal received over the telephone lines is coupled to the terminal device. When routine 700 is initiated, item 704 disconnects the terminal device from the telephone lines. Item 706 then connects the serial device to the telephone lines. Decision 708 determines whether the serial device is off-hook. Control then passes to connected loop 710 which comprises decision 714. If the serial device is not off-hook, decision 716 determines whether the terminal device is off-hook. If so control passes to item 736 to connect the terminal device. If the terminal device is not off-hook, decision 718 monitors the telephone lines for a ringing signal. If a ringing signal is not detected, the program remains in the idle loop and control passes to item 704. If a ringing signal is detected by decision 718, control passes to decision 722 which determines whether ring counting is selected. If not, item 726 waits until the ringing signal stops. If ring counting is selected, control passes to decision 724 which determines whether the selected number of rings has occurred. If so, control passes to item 736. If the ringing stops either because the ringing stops in less than N rings as detected by decision 626 or because a parallel or serial device answers the call as detected by item 628, the program enters monitor loop 728.

The monitor loop 728 monitors the telephone lines for the presence of a control signal; either a CNG tone or DTMF tone wherein the terminal device will be coupled to the telephone line if either tone is detected. The monitor loop 728 comprises decision 730 which tests the signal produced by the CNG detector 440 to determine whether the CNG signal is present on the telephone lines. If so, control passes to item 736. If not, program control proceeds to decision 732 to determine whether a DTMF signal is present. If so, control proceeds to item 736. If not, control passes to decision 734 to determine whether 20 seconds have elapsed. If 20 seconds have not elapsed, control returns to decision 730. If 20 seconds have elapsed, control returns to idle loop 702 at item 704.

When invoked, item 736 connects the terminal device. Item 738 then disconnects the serial device and control passes to connected loop 740 which comprises decision 742. Decision 742 monitors the on-hook detector to determine whether the call is still in progress or whether the terminal device is on-hook. If the terminal device is not on-hook, the program remains in connected loop 740. If the terminal device makes a transition to an on-hook condition, the program returns to idle loop 702 at item 704 to wait for the next incoming or outgoing call.

In summary, an improved system for managing voice and data messages in a telephone system has been described. The present invention contemplates a system which may be used with parallel or serial connected voice devices as well as data devices such as facsimile systems or modems. The present invention provides a method and means by which a facsimile system may be operated in a normal manner or may be operated remotely by any of a number of parallel connected devices. In addition, the present invention provides a method and means by which voice and data devices can share a single telephone line without the inconvenience of a data device answering an incoming call before a voice device is able to answer. Once a voice device answers a call, a facsimile sequence may be initiated remotely from the voice device by depressing a key or keys on the telephone keypad. Accordingly, other uses and modifications of the present invention will be apparent to persons of ordinary skill in the art without departing from the spirit and scope of the present invention. All of such modifications and uses are intended to fall within the scope of the appended claims:

We claim:

1. An apparatus for automatically routing an incoming data telephone signal on a pair of telephone lines to a data receiving terminal device such as a facsimile machine for use with a telephone system with one or more telephone devices connected directly to the telephone lines and independent of and unaffected by the connection of the apparatus to the telephone lines, the apparatus being operable in at least one response mode which allows an incoming call on the telephone lines to be answered by any one of the telephone devices connected directly to the telephone lines, comprising:

a connector to connect the apparatus in parallel with the telephone lines;

a ringing signal detector operable in said response mode to detect a ringing signal of an incoming call on the telephone lines without taking the telephone system off-hook, and generate a ringing detection signal if a ringing signal is detected;

a control signal detector operable in said response mode to detect a predetermined control signal on the telephone lines during an incoming call which has been answered by one of the telephone devices connected directly to the telephone lines, and generate a control detection signal if said predetermined control signal is detected;

a controller, coupled to said ringing signal detector and said control signal detector, and operable in said response mode to generate a switching control signal in response to receipt of said ringing detection signal from said ringing signal detector followed by receipt of said control detection signal from said control signal detector; and a first switch, coupled between the telephone lines and the terminal device, which selectively connects the terminal device to the telephone lines, said first switch having an idle first mode during which the terminal device is disconnected from the telephone lines, and a second mode during which the terminal device is connected to the telephone lines, said first switch being in said first mode while the apparatus is awaiting detection of both a ringing signal of an incoming call and said predetermined control signal on the telephone lines, and said first switch switching to said second mode in response to receipt of said switching control signal from said controller.

2. The apparatus of claim 1 for use with a telephone system with an additional telephone device connected indirectly to the telephone lines through the apparatus, wherein said control signal detection means is also operable in said response mode for detecting said predetermined control signal on the telephone lines during an incoming call which has been answered by the additional telephone device, and generating said control detection signal if said predetermined control signal is detected, and wherein the apparatus further includes a second switch, coupled between the telephone lines and the additional telephone device, which selectively connects the additional telephone device to the telephone lines, said second switch also being coupled to said controller, said second switch having an idle first mode during which the additional telephone device is connected to the telephone lines, and a second mode during which the additional telephone device is disconnected from the telephone lines, said second switch being in said first mode while the apparatus is awaiting detection of both a ringing signal of an incoming call and said predetermined control signal on the telephone lines, said second switch switching to said second mode in response to receipt of said switching control signal from said controller.

3. The apparatus of claim 1 further including:
a ringing signal generator, coupled to the terminal device, which generates a control ringing signal in response to receipt of an enabling signal from said controller; and
an off-hook detector, coupled to the terminal device, which detects an off-hook condition of the terminal device, and generates an off-hook detection signal if the terminal device is off-hook; and
wherein said controller first generates said enabling signal in response to receipt of said ring detection signal from said ringing signal detector followed by receipt of said control detection signal from said control signal detector, and then in response to receipt of said off-hook detector signal from said off-hook detector generates said switching control signal.

4. The apparatus of claim 3 wherein said ringing signal generator and said off-hook detector are coupled to the terminal device through said first switch, said ringing signal generator and said off-hook detector being connected to the terminal device when said first switch is in said first mode, and disconnected from the terminal device when said first switch is in said second mode.

5. The apparatus of claim 1 further including:
a ring coupler, coupled between the telephone lines and the terminal device, which couples a ringing signal of an incoming call on the telephone lines to the terminal device independent of and while said first switch is in said first mode; and
an off-hook detector, coupled to the terminal device, which detects an off-hook condition of the terminal device, and generating an off-hook detection signal if the terminal device is off-hook; and
wherein said controller, in response to receipt of said off-hook detection signal from said off-hook detector, generates said switching control signal.

6. The apparatus of claim 1 further including:
an on-hook detector, coupled to the terminal device, which detects an on-hook condition of the terminal device, and generates an on-hook detection signal if the terminal device returns to the on-hook condition after being connected to the telephone lines by said first switch to receive the incoming data telephone signal; and
wherein said controller generates a reset signal in response to receipt of said on-hook detection signal from said on-hook detector, and said first switch resets to said first mode in response to receipt of said reset signal from said controller.

7. The apparatus of claim 6 wherein said on-hook detector is coupled to the terminal device through said first switch, said on-hook detector being disconnected from the terminal device when said first switch is in said first mode, and connected to the terminal device when said second switch is in said second mode.

8. An apparatus for automatically routing an incoming data telephone signal on a pair of telephone lines to a data receiving terminal device such as a facsimile machine for use with a telephone system with one or more telephone devices connected directly to the telephone lines an independently of and unaffected by the connection of the apparatus to the telephone lines, the apparatus being operable in at least one response mode which allows an incoming call on the telephone lines to be answered by any one of the telephone devices connected directly to the telephone lines, comprising:

a connector to connect the apparatus in parallel with the telephone lines;

a ringing signal detector operable in said response mode to detect a ringing signal of an incoming call on the telephone lines without taking the telephone system off-hook, and generate a ringing detection signal if a ringing signal is detected;

a control signal detector operable in said response mode to detect a predetermined control signal on the telephone lines during an incoming call which has been answered by one of the telephone devices connected directly to the telephone lines, and generate a control detection signal if said predetermined control signal is detected;

a ringing signal generator, coupled to the terminal device, which generates a control ringing signal in response to receipt of an enabling signal;

an off-hook detector, coupled to the terminal device, which detects an off-hook condition of the terminal device, and generates an off-hook detection signal if the terminal device is off-hook;

an on-hook detector, coupled to the terminal device, which detects an on-hook condition of the terminal device, and generates an on-hook detection signal if the terminal device is on-hook;

a controller, coupled to said ringing signal detector, said control signal detector said ringing signal generator, said off-hook detector and said on-hook detector, and operable in said response mode to generate a switching control signal in response to receipt of said ringing detector signal from said ringing signal detector followed by receipt of said control detection signal from said control signal detector, said controller further generating said enabling signal in response to receipt of said ring detection signal from said ringing signal detector followed by receipt of said control detecting signal from said control signal detector, and then in response to receipt of said off-hook detector signal from said off-hook detector generating said switching control signal, said controller generating a reset signal in response to receipt of said on-hook detection signal from said on-hook detector; and a first switch, coupled between the telephone lines and the terminal device, which selectively connects the terminal device to the telephone lines, said first switch having an idle first mode during which the terminal device is disconnected from the telephone lines, and a second mode during which the terminal device is connected to the telephone lines, said first switch being in said first mode while the apparatus is awaiting detection of both a ringing signal of an incoming call and said predetermined control signal on the telephone lines, and said first switch switching to said second mode in response to receipt of said switch control signal from said controller, said first switch resetting to said first mode in response to receipt of said reset signal from said controller to return the terminal device to the on-hook condition after having been connected to the telephone lines by said first switch for receiving the incoming data telephone signal.

9. The apparatus of claim 8 wherein said ringing signal generator and said off-hook detector are coupled to the terminal device through said first switch, said ringing signal generator and said off-hook detector being connected to the terminal device when said first switch is in said first mode, and disconnected from the terminal device when said first switch is in said second mode.

10. The apparatus of claim 8 for use with a telephone system with an additional telephone device connected indirectly to the telephone lines through the apparatus, wherein said control signal detection means is also operable in said response mode for detecting said predetermined control signal on the telephone lines during an incoming call which has been answered by the additional telephone device, and generating said control detection signal if said predetermined control signal is detected, and wherein the apparatus further includes a second switch, coupled between the telephone lines and the additional telephone device, which selectively connects the additional telephone device to the telephone lines, said second switch also being coupled to said controller, said second switch having an idle first mode during which the additional telephone device is connected to the telephone lines, and a second mode during which the additional telephone device is disconnected from the telephone lines, said second switch being in said first mode while the apparatus is awaiting detection of both a ringing signal of an incoming call and said predetermined control signal on the telephone lines, said second switch switching to said second mode in response to receipt of said switching control signal from said controller.

11. The apparatus of claim 8 wherein said on-hook detector is coupled to the terminal device through said first switch, said on-hook detector being disconnected from the terminal device when said first switch is in said first mode and connected to the terminal device when said second switch is in said second mode.

12. An apparatus for automatically routing an incoming data telephone signal on a pair of telephone lines to a data receiving terminal device such as a facsimile machine for use with a telephone system with one or more telephone devices connected directly to the telephone lines and independent of and unaffected by the connection of the apparatus to the telephone lines, and an additional telephone device connected indirectly to the telephone lines through the apparatus, the apparatus being operable in at least one response mode which allows an incoming call on the telephone lines to be answered by any one of the telephone devices connected directly to the telephone lines and by said additional telephone device, comprising:

a connector to connect the apparatus in parallel with the telephone lines;

a ringing signal detector operable in said response mode to detect a ringing signal of an incoming call on the telephone lines without taking the telephone system off-hook, and generate a ringing detection signal if a ringing signal is detected;

a control signal detector operable in said response mode to detect a predetermined control signal on the telephone lines during an incoming call whether the incoming call has been answered by one of the telephone devices connected directly to the telephone lines or by the additional telephone device, and generate a control detection signal if said predetermined control signal is detected;

a ringing signal generator, coupled to the terminal device, which generates a control ringing signal in response to receipt of an enabling signal;

an off-hook detector, coupled to the terminal device, which detects an off-hook condition of the terminal device, and generates an off-hook detection signal if the terminal device is off-hook;

a controller, coupled to said ringing signal detector, said control signal detector, said ringing signal generator and said off-hook detector, and operable in said response mode to generate a switching control signal in response to receipt of said ring detector signal from said ringing signal detector followed by receipt of said control detection signal from said control signal detector, and also to first generate said enabling signal in response to receipt of said control detecting signal from said control signal detector, and then in response to receipt of said off-hook detector signal from said off-hook detector to generate said switching control signal;

a first switch, coupled between the telephone lines and the terminal device, which selectively connects the terminal device to the telephone lines, and said first switch having an idle first mode during which the terminal device is disconnected from the telephone lines, and a second mode during which the terminal device is connected to the telephone lines, said first switch being in said first mode while the apparatus is awaiting detection of both a ringing signal of an incoming call and said predetermined control signal on the telephone lines, and said first switch switching to said second mode in response to receipt of said switch control signal from said controller; and a second switch, coupled between the telephone lines and the additional telephone device, which selectively connects the additional telephone device to the telephone lines, said second switch also being coupled to said controller, said second switch having an idle first mode during which the additional telephone device is connected to the telephone lines, and a second mode during which the additional telephone device is disconnected from the telephone lines, said second switch being in said first mode while the apparatus is awaiting detection of both a ringing signal of an incoming call and said predetermined control signal on the telephone lines, said second switch switching to said second mode in response to receipt of said switching control signal from said controller.

13. The apparatus of claim 12 wherein said ringing signal generator and said off-hook detector are coupled to the terminal device through said first switch, said ringing signal generator and said off-hook detector being connected to the terminal device when said first switch is in said first mode, and disconnected from the terminal device when said first switch is in said second mode.

14. The apparatus of claim 12 further including:
an on-hook detector, coupled to the terminal device, which detects an on-hook condition of the terminal device, and generates an on-hook detection signal if the terminal device returns to the on-hook condition after being connected to the telephone lines by said first switch to receive the incoming data telephone signal; and
wherein said controller generates a reset signal in response to receipt of said on-hook detection signal from said on-hook detector, and said first switch resets to said first mode in response to receipt of said reset signal from said controller.

15. The apparatus of claim 14 wherein said on-hook detector is coupled to the terminal device through said first switch, said on-hook detector being disconnected from the terminal device when said first switch is in said first mode, and connected to the terminal device when said second switch is in said second mode.

16. An apparatus for automatically routing an incoming data telephone signal on a pair of telephone lines to a data receiving terminal device such as a facsimile machine for use with a telephone system with one or more telephone devices connected directly to the telephone lines and independent of and unaffected by the connection of the apparatus to the telephone lines, the apparatus being operable in at least one response mode which allows an incoming call on the telephone lines to be answered by any one of the telephone devices connected directly to the telephone lines without requiring an incoming call be answered by an automatic telephone answering device, comprising:

means for connecting the apparatus in parallel with the telephone lines;

ringing signal detection means operable in said response mode for detecting a ringing signal of an incoming call on the telephone lines without taking the telephone system off-hook and without supplying the ringing signal to an activated automatic telephone answering device for answering by the automatic telephone answering device, and generating a ringing detection signal if a ringing signal is detected;

control signal detection means operable in said response mode for detecting a predetermined control signal on the telephone lines during an incoming call which has been answered by one of the telephone devices connected directly to the telephone lines, and generating a control detection signal if said predetermined control signal is detected;

controller means, coupled to said ringing signal detection means and said control signal detection means, and operable in said response mode of generating a switching control signal in response to receipt of said ringing detection signal from said ringing signal detection means followed by receipt of said control detection signal from said control signal detection means; and first switching means, coupled between the telephone lines and the terminal device, for selectively connecting the terminal device to the telephone lines, said first switching means having an idle first mode during which the terminal device is disconnected from the telephone lines, and a second mode during which the terminal device is connected to the telephone lines, said first switching means being in said first mode while the apparatus is awaiting detection of both a ringing signal of an incoming call and said predetermined control signal on the telephone lines, and said first switching means switching to said second mode in response to receipt of said switching control signal from said controller means, whereby the apparatus may be connected to the telephone lines in parallel to the one or more telephone devices connected directly to the telephone lines without modification of the existing telephone line wiring and with the telephone devices connected directly to the telephone lines remaining fully operational for answering incoming calls even if at locations physically remote from the apparatus and the terminal device to which it is connected, the apparatus not itself answering incoming calls and only connecting the terminal device to the telephone lines to receive the incoming data telephone signal if an incoming call is first answered and then said predetermined control signal is detected on the telephone lines.

17. An apparatus for automatically routing an incoming data telephone signal on a pair of telephone lines to a data receiving terminal device such as a facsimile machine for use with a telephone system with one or more telephone devices connected directly to the telephone lines and independent of and unaffected by the connection of the apparatus to the telephone lines, the apparatus being operable in at least one response mode which allows an incoming call on the telephone lines to be answered by any one of the telephone devices connected directly to the telephone lines, comprising:

means for connecting the apparatus in parallel with the telephone lines;

ringing signal detection means operable in said response mode for detecting a ringing signal of an incoming call on the telephone lines without taking the telephone system off-hook, and generating a ringing detection signal if a ringing signal is detected;

control signal detection means operable in said response mode for detecting a predetermined control signal on the telephone lines during an incoming call which has been answered by one of the telephone devices connected directly to the telephone lines, and generating a control detection signal if said predetermined control signal is detected;

controller means, coupled to said ringing signal detection means and said control signal detection means, and operable in said response mode for generating a switching control signal in response to receipt of said ringing detection signal from said ringing signal detection means followed by receipt of said control detection signal from said control signal detection means; and first switching means, coupled between the telephone lines and the terminal device, for selectively connecting the terminal device to the telephone lines, said first switching means having an idle first mode during which the terminal device is disconnected from the telephone lines, and a second mode during which the terminal device is connected to the telephone lines, said first switching means being in said first mode while the apparatus is awaiting detection of both a ringing signal of an incoming call and said predetermined control signal on the telephone lines, and said first switching means switching to said second mode in response to receipt of said switching control signal from said controllers means, whereby the apparatus is connectable to the telephone lines in parallel with one or more telephone devices connected directly to the telephone lines without modification of the existing telephone line wiring and with the telephone devices connected directly to the telephone lines remaining fully operational for answering incoming calls even if at locations physically remote from the apparatus and the terminal device to which it is connected, and when so connected the apparatus does not itself answer incoming calls and only connects the terminal device to the telephone lines to receive the incoming data telephone signal if an incoming call is first answered and then said predetermined control signal is detected on the telephone lines.

18. The apparatus of claim 17 for use with a telephone system with an additional telephone device connected indirectly to the telephone lines through the apparatus, wherein said control signal detection means is also operable in said response mode for detecting said predetermined control signal on the telephone lines during an incoming call which has been answered by the additional telephone device, and generating said control detection signal if said predetermined control signal is detected, and wherein the apparatus further includes second switching means, coupled between the telephone lines and the additional telephone device, for selectively connecting the additional telephone device to the telephone lines, said second switching means also being coupled to said controller means, said second switching means having an idle first mode during which the additional telephone device is connected to the telephone lines, and a second mode during which the additional telephone device is disconnected from the telephone lines, said second switching means being in said first mode while the apparatus is awaiting detection of both a ringing signal of an incoming call and said predetermined control signal on the telephone lines, said second switching means switching to said second mode in response to receipt of said switching control signal from said controller means, whereby the one or more telephone devices connected directly to the telephone lines or the additional telephone device connected to the telephone lines through the apparatus may answer an incoming call, and once the call is answered and then said predetermined control signal is detected on the telephone lines, the apparatus connects the terminal device to the telephone lines and disconnects the additional telephone device from the telephone lines.

19. The apparatus of claim 17 further including:
ringing signal generator means, coupled to the terminal device, for generating a control ringing signal in response to receipt of an enabling signal from said controller means; and off-hook detector means, coupled to the terminal device, for detecting an off-hook condition of the terminal device, and generating an off-hook detection signal if the terminal device is off-hook; and wherein said controller means first generates said enabling signal in response to receipt of said ring detection signal from said ringing signal detection means followed by receipt of said control detection signal from said control signal detection means, and then in response to receipt of said off-hook detector signal from said off-hook detector means generates said switching control signal, whereby said controller means causes said ringing signal generator means to provide said control ringing signal to the terminal device to cause the terminal device to go off-hook in response thereto after an incoming call is first answered and then said predetermined control signal is detected on the telephone lines, and when the off-hook condition of the terminal device is detected by the off-hook detector means, said controller means generates said switching control signal to cause said first switching means to switch to said second mode during which the terminal device is connected to the telephone lines to receive the incoming data telephone signal.

20. The apparatus of claim 19 wherein said ringing signal generator means and said off-hook detector means are coupled to the terminal device through said first switching means, said ringing signal generator means and said off-hook detector means being connected to the terminal device when said first switching means is in said first mode, and disconnected from the terminal device when said first switching means is in said second mode.

21. The apparatus of claim 17 further including:
ring coupling means, coupled between the telephone lines and the terminal device, for coupling a ringing signal of an incoming call on the telephone lines to the terminal device independent of and while said first switching means is in said first mode; and off-hook detector means, coupled to the terminal device, for detecting an off-hook condition of the terminal device, and generating an off-hook detection signal if the terminal device is off-hook; and wherein said controller means, in response to receipt of said off-hook detection signal from said off-hook detector means, generates said switching control signal, whereby the terminal device goes off-hook in response to a ringing signal on the telephone lines while said first switching means is still in said first mode and before said controller means generates said switching control signal to cause said first switching means to switch to said second mode during which the terminal device is connected to the telephone lines to receive the incoming data telephone signal.

22. The apparatus of claim 17 further including:
on-hook detector means, coupled to the terminal device, for detecting an on-hook condition of the terminal device, and generating an on-hook detection signal if the terminal device returns to the on-hook condition after being connected to the telephone lines by said first switching means to receive the incoming data telephone signal; and
wherein said controller means generates a reset signal in response to receipt of said on-hook detection signal from said on-hook detector means, and said first switching means resets to said first mode in response to receipt of said reset signal from said controller means.

23. The apparatus of claim 22 wherein said on-hook detector means is coupled to the terminal device through said first switching means, said on-hook detector means being disconnected from the terminal device when said first switching means is in said first mode, and connected to the terminal device when said second switching means is in said second mode.

* * * * *

UNITED STATES PATENT AND TRADEMARK OFFICE
CERTIFICATE OF CORRECTION

PATENT NO. : 5,151,972

DATED : September 29, 1992

INVENTOR(S) : Alan S. Lorenz and Christopher K. Sutton

It is certified that error appears in the above-identified patent and that said Letters Patent is hereby corrected as shown below:

In column 16, claim 8, line 38, please delete "an" and substitute therefor --and--.

Signed and Sealed this

Twenty-third Day of November, 1993

Attest:

BRUCE LEHMAN

Attesting Officer

Commissioner of Patents and Trademarks